(12) United States Patent  (10) Patent No.: US 7,592,759 B2
Shibatani  (45) Date of Patent: Sep. 22, 2009

(54) STEPPING MOTOR SERVO DRIVING METHOD AND DRIVING MECHANISM

(75) Inventor: Kazuhiro Shibatani, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 743 days.

(21) Appl. No.: 11/272,567

(22) Filed: Nov. 10, 2005

(65) Prior Publication Data

US 2006/0108964 A1   May 25, 2006

(30) Foreign Application Priority Data

Nov. 19, 2004   (JP) .............................. 2004-336498

(51) Int. Cl.
*G03B 17/00* (2006.01)
*G03B 5/00* (2006.01)

(52) U.S. Cl. .................. 318/119; 318/685; 396/52; 396/55

(58) Field of Classification Search .......... 318/685, 318/696, 119; 396/52, 55, 303
See application file for complete search history.

(56) References Cited

U.S. PATENT DOCUMENTS

| | | | | |
|---|---|---|---|---|
| 4,262,336 A | * | 4/1981 | Pritchard | 318/696 |
| 5,298,933 A | * | 3/1994 | Chigira | 396/82 |
| 5,598,246 A | * | 1/1997 | Miyamoto et al. | 396/55 |
| 5,724,617 A | * | 3/1998 | Hirano et al. | 396/55 |
| 5,847,874 A | * | 12/1998 | Sasao et al. | 359/554 |
| 5,966,549 A | * | 10/1999 | Hara et al. | 396/54 |
| 6,750,627 B2 | * | 6/2004 | Holdaway | 318/696 |
| 2004/0081437 A1 | * | 4/2004 | Asada et al. | 386/131 |
| 2006/0285837 A1 | * | 12/2006 | Mashima et al. | 396/55 |
| 2006/0285838 A1 | * | 12/2006 | Mashima et al. | 396/55 |

FOREIGN PATENT DOCUMENTS

JP   11-041989   2/1999
JP   2000-093846   4/2000

* cited by examiner

*Primary Examiner*—Walter Benson
*Assistant Examiner*—Eduardo Colon-Santana
(74) *Attorney, Agent, or Firm*—Brinks Hofer Gilson & Lione

(57) ABSTRACT

A servo driving method of the present invention to drive a stepping motor driven by a predetermined driving pulse, by a servo control method, is comprising a setting step of setting a driving mode of the stepping motor switchable at least between a first driving mode, in which the stepping motor is driven with a relatively large current, and a second driving mode, in which the stepping motor is driven with a relatively small current, and a switching step of switching the driving mode between the first driving mode and the second driving mode when a predetermined mode switching information is given. Thereby, it becomes possible to reduce the power consumption by supplying power efficiently to the stepping motor.

9 Claims, 16 Drawing Sheets

(a)

(b)

STEPPING MOTOR SERVO DRIVING METHOD AND DRIVING MECHANISM

This application is based on Japanese Patent Application No. 2004-336498 filed in Japan on 19 Nov. 2004, the entire content of which is hereby incorporated by reference.

FIELD OF THE INVENTION

The present invention relates to a driving method for driving a stepping motor in accordance with a servo control scheme, a driving mechanism having a stepping motor, and an imaging apparatus equipped with such a driving mechanism.

DESCRIPTION OF RELATED ART

Stepping motors driven by being pulsed in accordance with prescribed driving schemes are widely used as drive sources for various kinds of driving mechanisms. Since the driving condition of the motor can be kept track of by counting the drive pulses applied to it, the stepping motor has the advantage that it can be driven using control schemes generally known as open loop control which does not require feedback control, etc. and can therefore simplify the control configuration. As a driving method for such a stepping motor, Japanese Unexamined Patent Publication No. H11-41989, for example, discloses a driving method (microstep driving method) which controls the motor speed by applying clock pulses to the stepping motor that match the desired rotational speed.

In recent years, increasing numbers of cameras, typically digital cameras, have come to be equipped with camera shake correction mechanisms which drive the imaging systems (lens barrel, imaging device, etc.) in swinging fashion so as to correct for camera shake or other unwanted camera movement. A driving mechanism commonly employed in such a camera shake correction mechanism comprises an actuator that uses a moving coil, piezoelectric element, or the like and a position detection sensor that uses a Hall element or the like, and the driving mechanism is driven in accordance with the so-called closed loop servo control which performs feedback control based on the position detection result supplied from the position detection sensor.

For digital cameras, etc., there has always been a need to reduce the size and cost. To meet such a need, it is essential to use off-the-shelf components and yet reduce the number of components. Accordingly, in the camera shake correction mechanism also, if the above-described stepping motor can be used as an actuator that can be driven in a servo control mode, then since this actuator is an off-the-shelf component, the cost can be reduced and, since open loop control can be performed, the position detection sensor can be eliminated, thus achieving reductions in the number of components as well as the size of the apparatus.

However, when the stepping motor is used as the actuator in the camera shake correction mechanism, the problem of power consumption required to drive the stepping motor and the problem of noise associated with the driving of the motor will become manifested. That is, in recent years, digital cameras, etc. have been shrinking in size and, with this trend, the batteries have also been made smaller in size and hence smaller in capacity. As a result, if the stepping motor is energized to drive the camera shake correction as many times as required, the battery may be exhausted early on; there is therefore a need to take some measures to reduce the power consumption.

Digital cameras, etc. have also come to be equipped with a moving image shooting mode as a standard feature, and therefore, due regard must be given to sound recording during moving image shooting. However, when the stepping motor is used as the actuator, rotor driving noise is generated during the driving of the motor, and this driving noise may also be recorded; therefore, there is also a need to take some measures to reduce the noise.

SUMMARY OF THE INVENTION

Accordingly, it is an object of the present invention to provide a driving method (mechanism) for driving a stepping motor in accordance with a servo control scheme, wherein provisions are made to achieve reductions in power consumption and noise; more particularly, it is an object of the present invention to provide a stepping motor servo driving method and driving mechanism wherein the stepping motor can be used advantageously as a driving mechanism in a camera shake correction mechanism or the like, for example, in an imaging apparatus, and also provide an imaging apparatus using the same.

The above object is achieved by providing the following configuration.

A stepping motor servo driving method according to the present invention is a servo driving method in which a stepping motor to be driven by prescribed drive pulses is driven in accordance with a servo control scheme, wherein the stepping motor is set switchable at least between a first driving mode, in which the stepping motor is driven with a relatively large current, and a second driving mode, in which the stepping motor is driven with a relatively small current, and when prescribed mode switching information is given, switching is made between the first driving mode and the second driving mode.

According to this method, when prescribed mode switching information occurs, the stepping motor is switched between the first driving mode in which it is driven with a relatively large current and the second driving mode in which it is driven with a relatively small current; therefore, by switching from one mode to the other according to the load condition under which to drive the stepping motor in servo control, and thus supplying power efficiently to the stepping motor, it becomes possible to reduce the power consumption. For example, if provisions are made to generate the mode switching information according to the criticality of the target position tracking ability in servo control, then the stepping motor can be driven in such a manner that when high tracking ability is required, switching is made to the first driving mode so that the stepping motor can be driven at high speed, but when high tracking ability is not much of an issue, switching is made to the second driving mode to reduce the power to be supplied to the stepping motor.

It is to be noted here that when the stepping motor is driven with a large current, a relatively strong rotational force is exerted upon the rotor, which tends to increase the driving noise when the rotor moves between magnetic poles. In view of this, if provisions are made to generate the mode switching information according to the need for suppressing the driving noise, then the stepping motor can be driven in such a manner that when there is a need to suppress the driving noise, switching is made to the second driving mode to drive the stepping motor in a low noise mode, but when it is not required to reduce the noise, or when priority is to be given to high speed driving, switching is made to the first driving mode.

In the above configuration, the servo control of the stepping motor may involve: setting a prescribed sampling interval;

acquiring control target information at every prescribed sampling interval; and setting, based on the acquired control target information, and at every prescribed sampling interval, conditions for generating drive pulses for driving the stepping motor, wherein the sampling interval in the first driving mode and the sampling interval in the second driving mode are the same in duration, while a maximum number of drive pulses that can be generated within the duration of the sampling interval is set smaller in the second driving mode than in the first driving mode.

According to this configuration, since the drive pulse generating conditions are set at every prescribed sampling interval, it becomes possible to reset the drive pulse generating conditions and set new drive conditions for the stepping motor at every sampling interval. Accordingly, the speed of the stepping motor can be controlled based on the number of drive pulses to be generated within the duration of the sampling interval. Then, by setting the duration of the sampling interval the same for both modes and, on the other hand, setting the maximum number of drive pulses that can be generated within the sampling interval smaller in the second driving mode than in the first driving mode, drive pulse generating conditions for high speed driving that can lead to step-out can be prevented from being set in the second mode in which the stepping motor is driven with a relatively small current.

Alternatively, in the above configuration, the servo control of the stepping motor may involve: setting a prescribed sampling interval; acquiring control target information at every prescribed sampling interval; and setting, based on the acquired control target information, and at every prescribed sampling interval, conditions for generating drive pulses for driving the stepping motor, wherein the sampling interval in the first driving mode and the sampling interval in the second driving mode have different durations from each other, and the sampling interval in the second driving mode is set longer than the sampling interval in the first driving mode.

According to this configuration, the speed of the stepping motor can likewise be controlled based on the number of drive pulses to be generated within the duration of the sampling interval; further, since the sampling interval in the second driving mode is set longer than the sampling interval in the first driving mode, if the number of drive pulses to be generated during one sampling interval is the same, the number of drive pulses per unit time is smaller in the second driving mode in which the stepping motor is driven with a relatively small current. In this way, drive pulse generating conditions for high speed driving that can lead to step-out can be prevented from being set in the second mode.

In the above configuration, the stepping motor can be constructed to be driven in microstepping mode. According to this configuration, higher resolution driving control can be achieved than can be achieved with other driving schemes (for example, two-phase excitation) of the stepping motor.

A stepping motor servo driving mechanism according to the present invention comprises: a stepping motor which is driven by prescribed drive pulses in accordance with a servo control scheme; a driver which can at least drive the stepping motor by selectively switching between a first driving mode, in which the stepping motor is driven with a relatively large current, and a second driving mode, in which the stepping motor is driven with a relatively small current; a mode switching section which performs switching between the first driving mode and the second driving mode when prescribed mode switching information is given; and a drive pulse generation control section which controls conditions for driving the drive pulses in accordance with the driving mode.

According to this configuration, in response to the prescribed mode switching information, the driving mode is switched by the mode switching section between the first driving mode in which the stepping motor is driven with a relatively large current and the second driving mode in which it is driven with a relatively small current; therefore, by switching from one mode to the other according to the load condition under which to drive the stepping motor in servo control or according to the need for suppressing driving noise, and thus supplying power efficiently to the stepping motor, it becomes possible to reduce the power consumption or drive the stepping motor in a low noise mode.

In the above configuration, a prescribed sampling interval at which to acquire control target information is set in the drive pulse generation control section, wherein the drive pulse generation control section can be constructed by including a calculating section which, at every prescribed sampling interval, resets the previous drive pulse generation conditions and performs calculations for setting the drive pulse generation conditions for the next sampling interval, and a limit setting section which sets an upper limit on the number of drive pulses to be generated within the sampling interval, in accordance with the mode switching information for switching between the first driving mode and the second driving mode by the mode switching section.

According to this configuration, since the drive pulse generating conditions are set at every prescribed sampling interval by the calculating section of the drive pulse generation control section, it becomes possible to reset the drive pulse generating conditions and set new drive conditions for the stepping motor at every sampling interval. Accordingly, the speed of the stepping motor can be controlled based on the number of drive pulses to be generated within the duration of the sampling interval. Further, since the limit setting section is provided which, in accordance with the first/second driving mode switching information, sets an upper limit on the number of drive pulses to be generated within the sampling interval, drive pulse generating conditions for high speed driving that can lead to step-out can be prevented from being set by the calculating section, for example, in the second mode in which the stepping motor is driven with a relatively small current.

Alternatively, in the above configuration, a prescribed sampling interval at which to acquire control target information is set in the drive pulse generation control section, wherein the drive pulse generation control section can be constructed by including a calculating section which, at every prescribed sampling interval, resets the previous drive pulse generation conditions and performs calculations for setting the drive pulse generation conditions for the next sampling interval, and a sampling interval setting section which varies the sampling interval in accordance with the mode switching information for switching between the first driving mode and the second driving mode by the mode switching section.

According to this configuration, the speed of the stepping motor can likewise be controlled based on the number of drive pulses to be generated within the duration of the sampling interval by the calculating section of the drive pulse generation control section. Further, since the sampling interval setting section is provided which varies the sampling interval in accordance with the mode switching information for switching between the first driving mode and the second driving mode, the sampling interval in the second driving mode, for example, can be made longer than that in the first driving mode to reduce the number of drive pulses to be generated per unit time in the second driving mode; by so doing, drive pulse generating conditions for high speed driving that can lead to step-out can be prevented from being set in the second mode in which the stepping motor is driven with a relatively small current.

An imaging apparatus according to the present invention comprises: an image shooting means for shooting an image of a subject; a camera shake correcting means, incorporating a prescribed driving mechanism, for correcting for mechanical shake occurring when the image shooting means performs the image shooting operation; and a control target position calculating section for calculating a driving target position for the camera shake correcting means based on the amount of shake detected by a prescribed shake detecting means, wherein the driving mechanism of the camera shake correction means comprises: a stepping motor which is driven by prescribed drive pulses in accordance with a servo control scheme; a driver which can at least drive the stepping motor by selectively switching between a first driving mode, in which the stepping motor is driven with a relatively large current, and a second driving mode, in which the stepping motor is driven with a relatively small current; a mode switching section which performs switching between the first driving mode and the second driving mode when prescribed mode switching information is given; and a drive pulse generation control section which controls conditions for driving the drive pulses in accordance with the driving mode.

According to this configuration, in response to the prescribed mode switching information, the driving mode is switched by the mode switching section between the first driving mode in which the stepping motor is driven with a relatively large current and the second driving mode in which it is driven with a relatively small current; therefore, by switching from one mode to the other according to the load condition under which to drive the stepping motor in servo control, and thus supplying power efficiently to the stepping motor, it becomes possible to reduce the power consumption. Accordingly, if provisions are made, for example, to generate the mode switching information according to the criticality of the target position tracking ability in servo control for the shake correction, then the stepping motor can be driven in such a manner that when high tracking ability is required (for example, when capturing a still image or when the deviation from the target position is large), switching is made to the first driving mode so that the stepping motor can be driven at high speed, but when high tracking ability for camera shake is not much of an issue (for example, in live view mode), switching is made to the second driving mode to reduce the power to be supplied to the stepping motor while allowing the shake correction performance to drop.

Further, if provisions are made to generate the mode switching information according to the need for suppressing the driving noise of the stepping motor, then the stepping motor can be driven in such a manner that when there is a need to suppress the driving noise (for example, in moving image shooting mode), switching is made to the second driving mode to drive the stepping motor in a low noise mode while allowing the shake correction performance to drop, but when it is not required to reduce the noise (for example, in still image shooting mode), or when priority is to be given to high speed driving (for example, when capturing a still image), switching is made to the first driving mode.

In the above configuration, the imaging apparatus is capable of shooting still images, wherein the mode switching section can be constructed to switch the mode to the first driving mode when capturing a still image and to the second driving mode when performing other operations. According to this configuration, the mode is set to the first driving mode only when capturing a still image which requires high tracking ability for camera shake correction, but the mode is set to the second driving mode in other operation modes; in this way, since the operation for camera shake correction in the first driving mode that consumes a relatively large current is limited to the minimum required cases, further reductions in power consumption and noise can be achieved.

Alternatively, in the above configuration, the imaging apparatus is capable of shooting still images, wherein the mode switching section can be constructed to perform switching between the first driving mode and the second driving mode based on whether the deviation between the driving target position information obtained by the control target position calculating section and the present position of the stepping motor exceeds a predetermined threshold value or not, and to effect the switching to the first driving mode when the deviation exceeds the predetermined threshold value. According to this configuration, when the deviation from the target position in the servo control is large, the mode is switched to the first driving mode so that the stepping motor can be driven at high speed, while when the deviation is small, the mode is switched to the second driving mode in which the current consumption is small; in this way, since power is supplied to the stepping motor according to the need for camera shake correction, and unnecessary current consumption is thus reduced, the effect of power consumption reduction can be achieved while constantly ensuring excellent camera shake correction performance.

BRIEF DESCRIPTION OF THE DRAWINGS

These and other objects and features of the present invention will become clear from the following description taken in conjunction with the preferred embodiments thereof with reference to the accompanying drawings, in which:

FIG. 1(a) shows a front view and FIG. 1(b) shows a rear view;

DETAILED DESCRIPTION OF THE PREFERRED EMBODIMENTS

Referring to the accompanying drawings, specific embodiments of the present invention will be described in detail below by taking as an example a lens barrel built-in type digital camera (imaging apparatus) to which a stepping motor servo driving mechanism (driving method) according to the invention is applied. (Brief Description of the Overall Construction of the Digital Camera)

Figure 1:
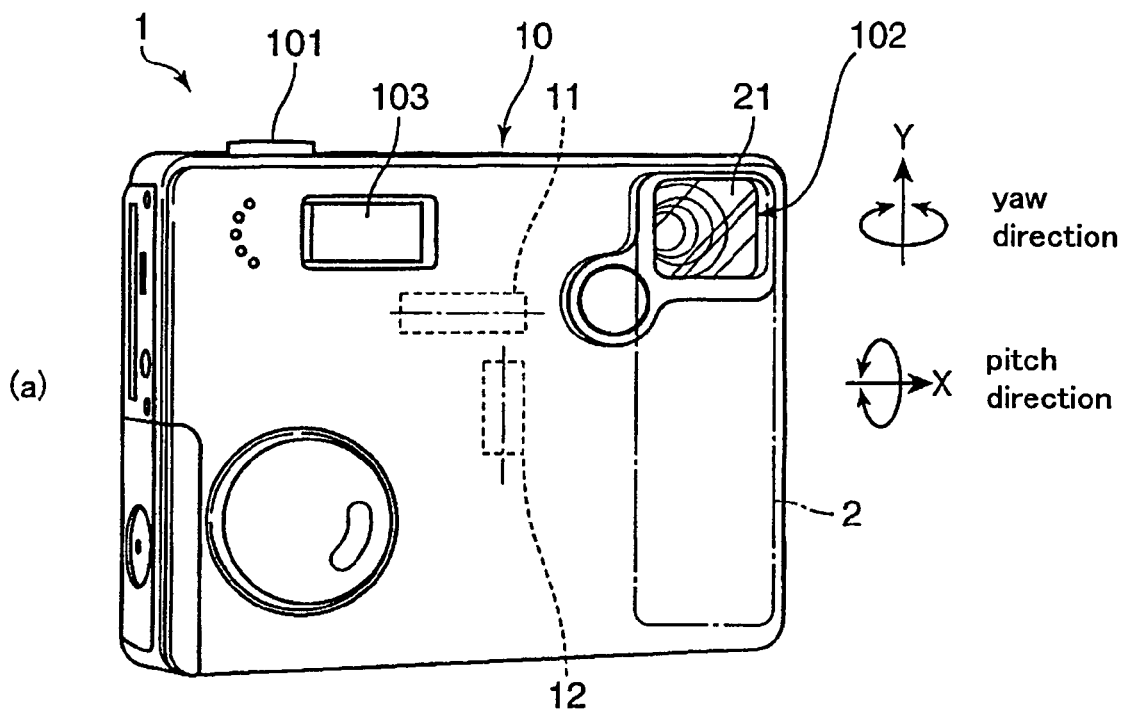
FIG. 1 is a diagram showing the external appearance of a digital camera according to an embodiment of the present invention.
Figure 1:
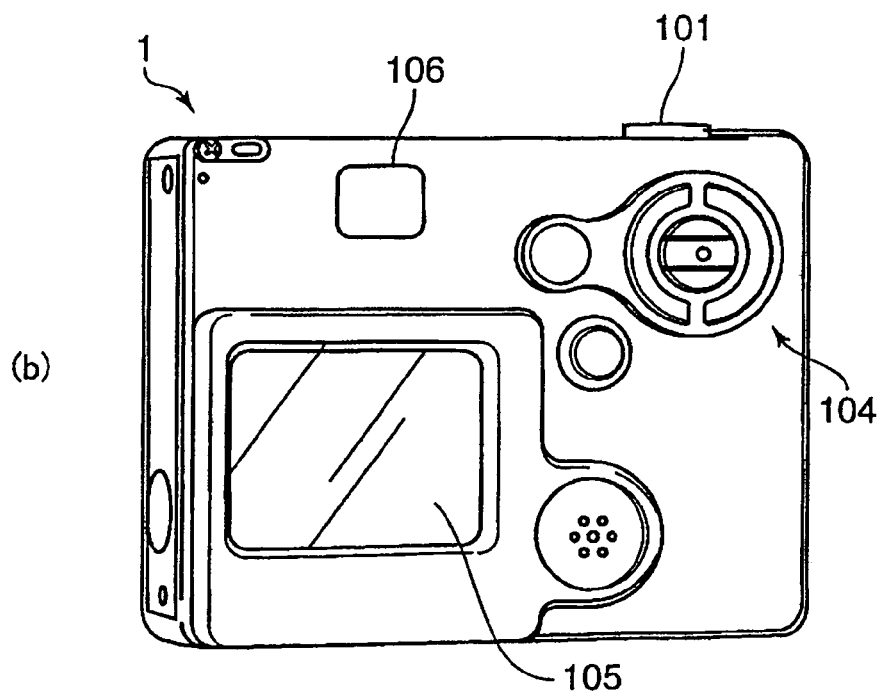

FIG. 1 is a diagram showing the external appearance of the digital camera 1 according to the present embodiment: FIG. 1(a) shows a front view and FIG. 1(b) shows a rear view. The lens barrel built-in type digital camera 1 includes: a shutter release button 101, etc. arranged on the top of a camera main body 10; a shooting window 102, a flash unit 103, etc. arranged on the front side; and various operation buttons 104, a display 105 such as a liquid crystal monitor (LCD), a viewfinder 106, etc. arranged on the rear side.

Inside the main body 10 is contained a folded-optics type lens barrel 2 which constitutes an imaging lens system for capturing an image of a subject via an objective lens 21 through the shooting window 102 and for directing the captured image to a solid-state imaging device mounted within the main body 10. The folded-optics type lens barrel 2 is a lens barrel whose length remains unchanged during zooming or focusing, that is, the lens barrel does not protrude outside the main body 10, and the solid-state imaging device is integrally mounted on its imaging surface side. The inside of the main body 10 further contains a pitch (P) shake detecting gyro 11 and a yaw (Ya) shake detecting gyro 12 as camera shake detecting means for detecting shaking movement applied to the camera 1. Here, with the horizontal direction (width direction) of the camera 1 taken as the X-axis direction, and the vertical direction (height direction) of the camera 1 as the Y-axis direction, the direction of rotation about the X-axis is defined as the pitch (P) direction, and the direction of rotation about the Y-axis as the yaw (Ya) direction.

The folded-optics type lens barrel 2 has a barrel-shaped construction which is mounted vertically inside the camera main body 10 (of course, it may be mounted horizontally), and is provided with a shake correcting means having a driving mechanism for driving the lens barrel 2 in swinging fashion. Then, when any shaking motion is detected on the main body 10 by the pitch shake detecting gyro 11 and the yaw shake detecting gyro 12, the lens barrel 2 is driven by the shake correcting means in swinging fashion in the pitch and yaw directions so as to offset the shaking motion.

Figure 2:
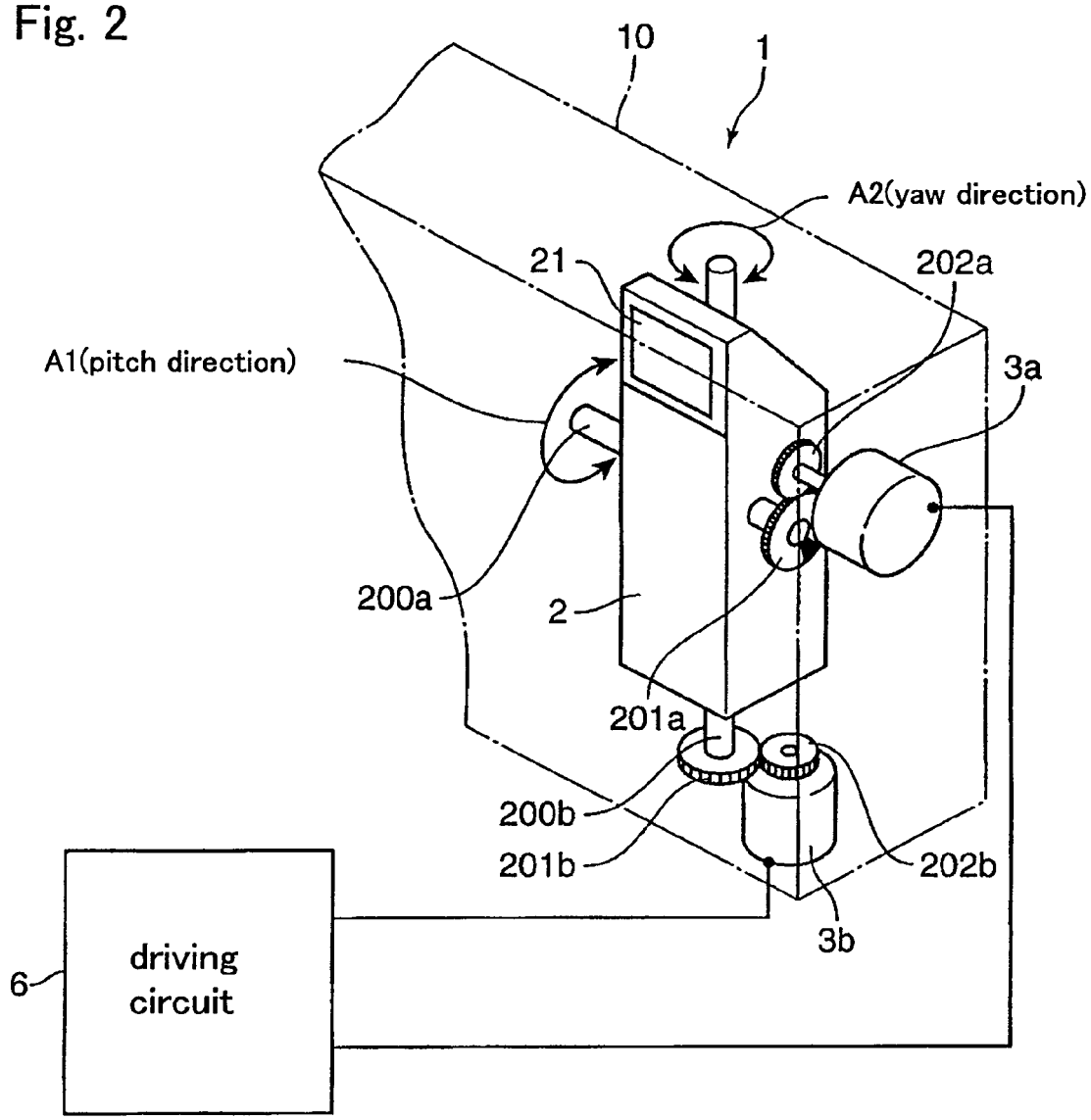
FIG. 2 is a perspective view schematically showing one example of a shaking driving mechanism for a lens barrel.

FIG. 2 is a perspective view schematically showing one example of the shaking driving mechanism (shake correcting mechanism) for the lens barrel 2. The lens barrel 2 is supported by a supporting means having supporting points at which the lens barrel 2 is supported in swingable fashion. In the example of FIG. 2, the lens barrel 2 is supported on a first rotating shaft 200a and its bearing (not shown) for allowing the lens barrel 2 to rotate (swing) in a first direction indicated by arrow A1 in the figure, and also on a second rotating shaft 200b and its bearing for allowing the lens barrel 2 to rotate in a second direction indicated by arrow A2 in the figure. The supporting means is not specifically limited in its type of support or in the number of supporting points, the only requirement being that the supporting means be capable of allowing the lens barrel 2 to swing at least in two axis directions. Accordingly, various types of support can be employed, including the type that swingably supports the lens barrel 2 by using one or more ball bearings, etc. or the type that supports the lens barrel 2 at multiple points by elastic members such as coil springs.

The lens barrel 2 is driven in swinging fashion in the pitch and yaw directions by a pitch direction motor 3a and a yaw direction motor 3b, respectively; these motors are each constructed from a stepping motor and are driven by a prescribed driving circuit (driver) 6. The pitch direction motor 3a and the yaw direction motor 3b are driven in accordance with a servo control scheme as will be described in detail later. The driver 6 in the present embodiment is a driver that can at least drive the pitch direction motor 3a and the yaw direction motor 3b by selectively switching between a first driving mode in which the motors are driven with a relatively large current and a second driving mode in which the motors are driven with a relatively small current.

A mechanism for transmitting the driving forces of the pitch direction motor 3a and the yaw direction motor 3b to the lens barrel 2 can be suitably set up. In the construction shown in the example of FIG. 2, a gear 201a fixed to the first rotating shaft 200a engages with a gear 202a fixed to the rotating shaft of the pitch direction motor 3a, thereby causing the lens barrel 2 to rotate in the arrow direction A1 about the first rotating shaft 200a within the camera main body 10, while a gear 201b fixed to the second rotating shaft 200b engages with a gear 202b fixed to the rotating shaft of the yaw direction motor 3b, thereby causing the lens barrel 2 to rotate in the arrow direction A2 about the second rotating shaft 200b. Here, the position of each stepping motor can be determined from the integrated value of the drive pulses input to the stepping motor (open loop control), but if it is nonetheless desired to employ closed loop control, a position sensor or the like for detecting the home position, etc. of the lens barrel 2 is additionally provided.

Figure 3:
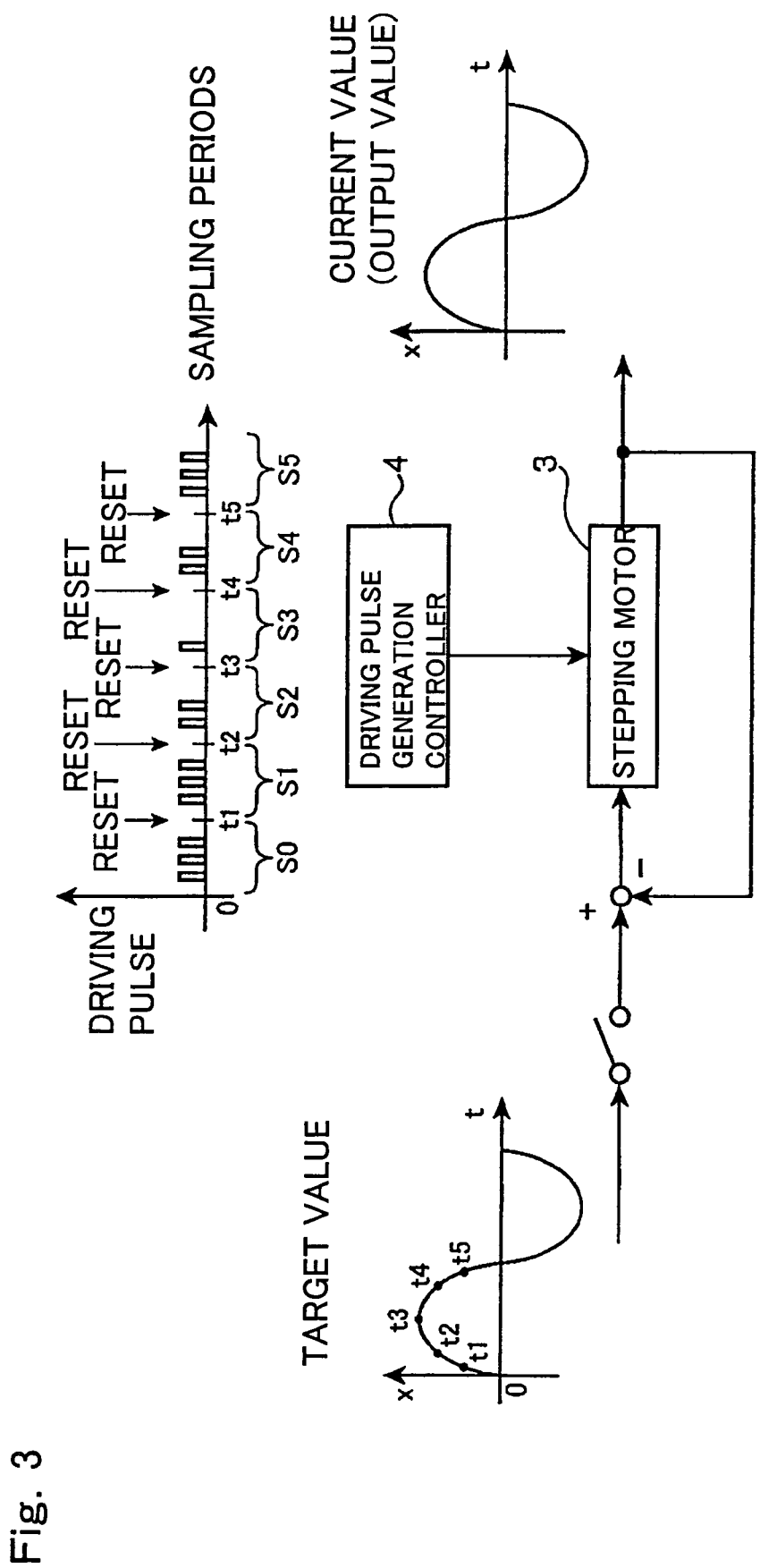
FIG. 3 is a block diagram schematically showing a servo control method according to the embodiment.

FIG. 3 is a simplified block diagram schematically showing the stepping motor servo control method employed in the present embodiment. The stepping motor 3 (corresponding to the pitch direction motor 3a and the yaw direction motor 3b) is driven in accordance with a servo control scheme which causes the present value (output value) to track the target value, and is also driven in an open loop control mode in which the driving condition (present value information) is kept track of by counting the input drive pulses. A drive pulse generation control section 4 sets the conditions for generating the drive pulses for driving the stepping motor 3.

In the above configuration, prescribed sampling times t1 to t5 are set to sample an arbitrarily varying target value (position information that provides the shake correction target). The drive pulse generation control section 4 acquires the control target information at every sampling time t1 to t5 and, in accordance with this control target information, resets the drive pulse generation conditions and sets new drive pulse generation conditions at every sampling time t1 to t5. That is, at sampling time t1, the drive pulse generation conditions for the preceding sampling interval S0 are reset regardless of whether the target position is reached or not, and new drive pulse generation conditions for the next sampling interval S1 are set. Similar operation is performed at each of the subsequent sampling times t2 to t5. Accordingly, the drive conditions for the stepping motor 3 can be set appropriately at every sampling time t1 to t5 in accordance with the variation of the target value, so that servo control that causes the present value to track the target value can be performed reliably.

The above sampling times t1 to t5 are suitably set according to the desired driving speed, resolution, and the performance of the stepping motor. The drive pulse generation conditions set at every sampling time t1 to t5 include, for example, the pulse rate and the number of drive pulses to be generated during each of the sampling intervals S1 to S5. Instead of the above open loop control, closed loop control may be employed; in that case, a position detection sensor, etc. should be additionally provided, and present value information to be compared with the control target information should be acquired at every sampling time t1 to t5 from the position detection sensor.

(Description of the Overall Electrical Configuration of the Digital Camera)

Figure 4:
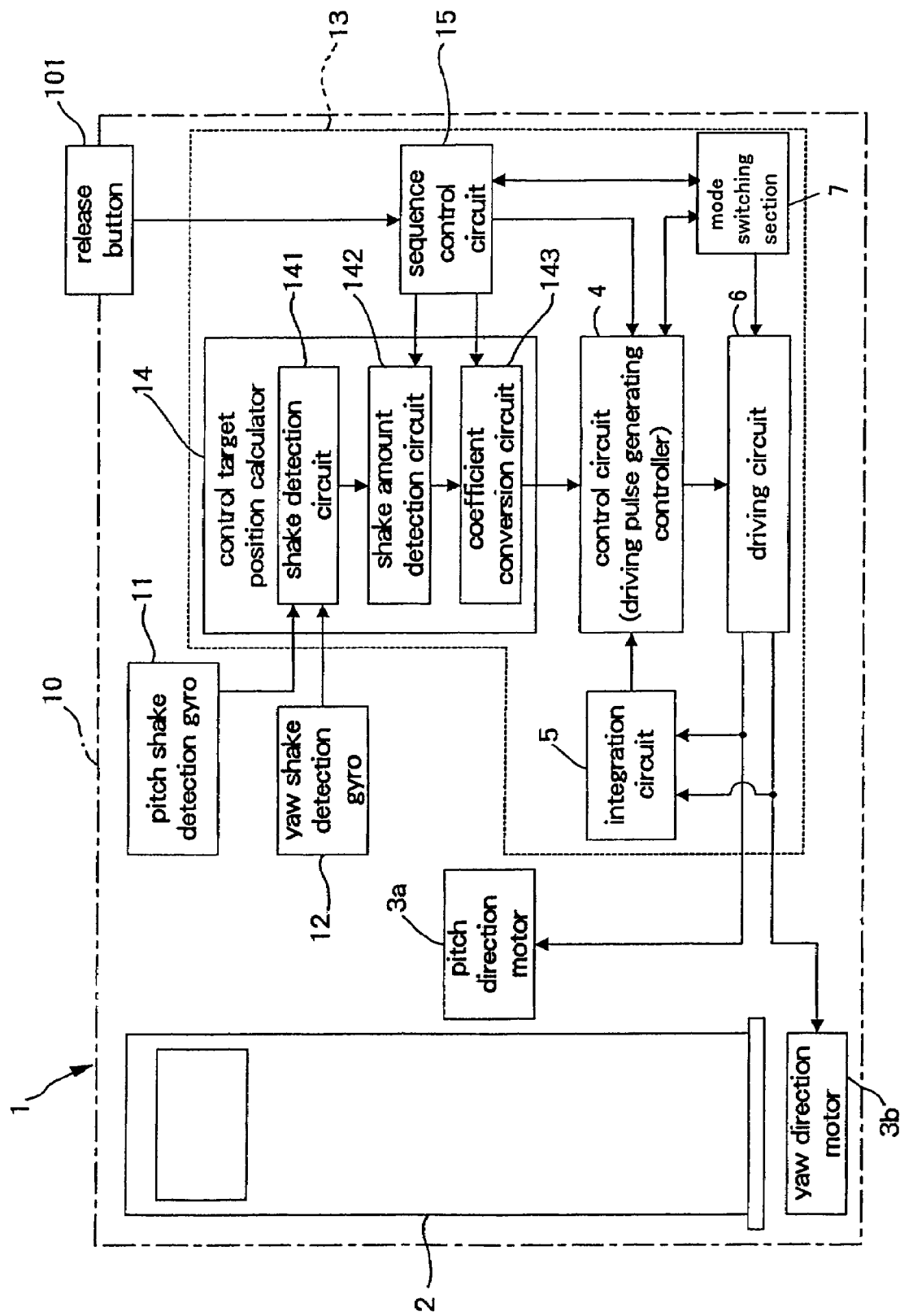
FIG. 4 is a block diagram schematically showing the configuration of the digital camera according to the embodiment by limiting the illustration to the essential portion of the electrical configuration relating to the present invention.

FIG. 4 is a block diagram schematically showing the configuration of the digital camera 1 according to the present embodiment by limiting the illustration to the essential portion of the electrical configuration relating to the present invention. The main body 10 of the digital camera 1 contains: the shutter release button 101; the pitch shake detecting gyro 11 and yaw shake detecting gyro 12 as the camera shake detecting means for detecting camera shake and other unwanted movement applied to the camera 1; a circuit device section 13 comprising various circuit substrate blocks; the lens barrel 2 constituting the imaging lens system; and the pitch direction motor 3a and yaw direction motor 3b, each constructed from the above-described stepping motor, for driving the lens barrel 2 so as to correct for camera shake. The circuit device section 13 comprises a control target position calculating section 14, sequence control circuit 15, control circuit 4 (drive pulse generation control section), integrator circuit 5, driver 6, and mode switching section 7.

The shutter release button 101 is an operation switch that the user presses when initiating a shooting operation; when the shutter release button 101 is half-pressed, the camera is ready for shooting. In this shooting ready condition, auto focus (AF) for automatically focusing on the subject, auto exposure (AE) for automatically determining the exposure, and the camera shake correction function for preventing blurred shots caused by camera shake are set into operation. To facilitate framing, the camera shake correction function continues to operate while the shutter release button 101 is being pressed. When the shutter release button 101 is fully depressed by the user, image shooting is accomplished. That is, exposure control is performed to provide proper exposure for the solid-stage imaging device in accordance with the exposure condition determined by AE.

The pitch shake detecting gyro 11 is a gyro sensor for detecting shaking motion of the camera 1 in the pitch direction (see FIG. 1), and the yaw shake detecting gyro 12 is a gyro sensor for detecting shaking motion of the camera 1 in the yaw direction. Each gyro sensor used here detects the angular velocity of the shaking motion when the target being measured (in the present embodiment, the camera main body 10) rotates due to the shaking motion. For such gyro sensors, use can be made, for example, of the type that applies a voltage to a piezoelectric element to set it into vibration, and that detects the angular velocity by extracting as an electrical signal the distortion caused by the Coriolis force occurring when the angular velocity due to the rotational motion is applied to the piezoelectric element.

The control target position calculating section 14 sets the control target information which is to be acquired at predetermined sampling intervals. That is, a pitch shake angular velocity signal, detected by the pitch shake detecting gyro 11, and a yaw shake angular velocity signal, detected by the yaw shake detecting gyro 12, are acquired, and the control target value for servo control (in this case, the position information of the lens barrel 2 as the driving target) is set. The control target position calculating section 14 comprises a shake detection circuit 141, a shake amount detection circuit 142, and a coefficient conversion circuit 143.

The shake detection circuit 141 comprises processing circuits such as a filter circuit (low pass filter and high pass filter) for reducing the noise and drift contained in the angular velocity signals detected by the pitch shake detecting gyro 11 and the yaw shake detecting gyro 12, and an amplifying circuit for amplifying the angular velocity signals. The angular velocity signals processed by these processing circuits are input to the shake amount detection circuit 142.

The shake amount detection circuit 142 takes each detected angular velocity signal at predetermined intervals of time, and supplies the amount of shake, detx, in the X-axis direction of the camera 1 and the amount of shake, dety, in the Y-axis direction to the coefficient conversion circuit 143. The coefficient conversion circuit 143 converts the amounts of shake (detx, dety) detected in the respective directions by the shake amount detection circuit 142 into the amounts of movement (px, py) in the respective directions, that is, the amounts of movement by which the lens barrel 2 is to be moved by the pitch direction motor 3a and the yaw direction motor 3b, respectively. Signals indicating the amounts of movement (px, py) in the respective directions, output from the coefficient conversion circuit 143, are input to the control circuit 4.

The control circuit 4 (drive pulse generation control section) acquires the control target information at predetermined sampling intervals and, in accordance with the acquired control target information, sets at every predetermined sampling interval the conditions for generating the drive pulses for driving the pitch direction motor 3a and the yaw direction motor 3b each constructed from the above-described stepping motor. The control circuit 4 converts the signals indicating the amounts of movement (px, py) in the respective directions into actual drive pulse signals (drvx, drvy) by taking into account the position information from the integrator circuit 5 described below, the operating characteristics of the pitch direction motor 3a and the yaw direction motor 3b, etc. That is, the control circuit 4 functions as a calculating means for calculating the conditions for generating the drive pulses necessary to drive the lens barrel 2 to track the control target value, in order to perform the camera shake correction control (servo control) for tracking the control target value generated by the control target position calculating section 14 based on the detection signals supplied from the pitch shake detecting gyro 11 and the yaw shake detecting gyro 12. The functions of the control circuit 4 will be described in detail later.

The integrator circuit 5 is provided to control the pitch direction motor 3a and the yaw direction motor 3b in open loop mode; that is, the integrator circuit 5 generates the present position information of the stepping motor, that is, the swing position information of the lens barrel 2, by integrating the drive pulses generated by the driver circuit 6 hereinafter described, and supplies the generated information to the control circuit 4. Here, if closed loop control is to be employed, the integrator circuit 5 is replaced by a position sensor and a conversion circuit for converting the sensing information supplied from the position sensor into position information.

The driver 6 includes a pulse generating circuit, etc. and generates the drive pulses for actually driving the pitch direction motor 3a and the yaw direction motor 3b. The drive pulses are generated based on the drive pulse generation control signal supplied from the control circuit 4. As earlier described, the drive 6 is a driver that can at least drive the pitch direction motor 3a and the yaw direction motor 3b (stepping motors) by selectively switching between the first driving mode in which the motors are driven with a relatively large current (hereinafter called the "large current mode") and the second driving mode in which the motors are driven with a relatively small current (hereinafter called the "small current mode").

Figure 5:
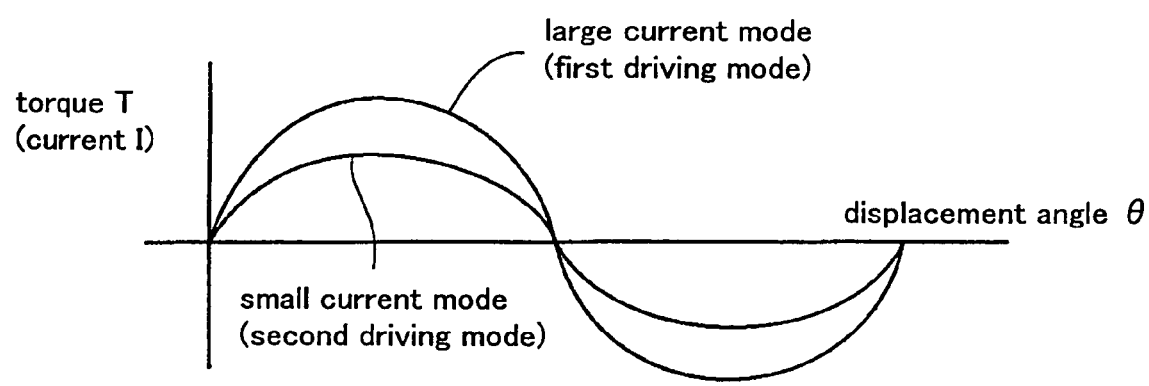
FIG. 5 is a graph diagram showing the relationship between the displacement angle of a rotor of a stepping motor and the current value I (torque T) flown per phase of the stepping motor for each mode, which is set in a driver.

FIG. 5 is a graph diagram showing the relationship between the displacement angle of the rotor of the stepping motor and the current value I (torque T) flown per phase of the stepping motor for each mode, which is set in the driver 6. As shown, the peak value in the small current mode is set smaller than that in the large current mode and, as a matter of course, the generated torque is large in the large current mode and small in the small current mode. In either mode, the stepping motor is driven with a constant current.

Figure 6:
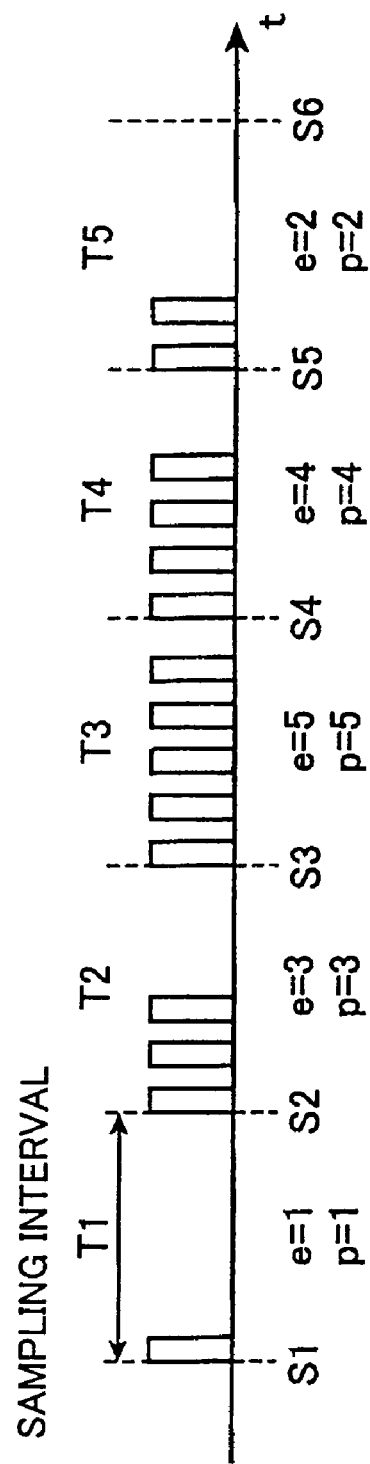
FIG. 6 is a time chart showing one example of drive pulse generation control.

The drive pulse generation control signal from the control circuit 4 is supplied at every predetermined (fixed) sampling time to the driver 6 which, in response, generates a prescribed number of drive pulses within the succeeding sampling interval. FIG. 6 is a time chart showing one example of how the drive pulses are generated by the driver 6. As shown, in each of the sampling intervals T1 to T5 between the respective sampling times S1 to S6, the necessary number of drive pulses P are generated in accordance with the deviation e from the target position. That is, in the sampling interval T1, since the deviation e=1, the number of drive pulse generated is P=1, and in the next sampling interval T2, since the deviation e=3, the number of drive pulse generated is P=3; in this way, the drive pulses P are, in principle, generated in accordance with the target position deviation e.

Here, the pulse rate of the drive pulses to be output during each of the sampling intervals T1 to T5 is suitably chosen by considering the relationship between load and torque (pull-in torque) so as not to cause step-out due to too small pulse spacing. Further, the maximum number of drive pulses to be output during each of the sampling intervals T1 to T5 is set so as not to exceed the maximum number of pulses that can be output at the above pulse rate within the predetermined duration of each sampling interval. In the example shown in FIG. 6, the maximum number of pulses is set as P=5.

Figure 7:
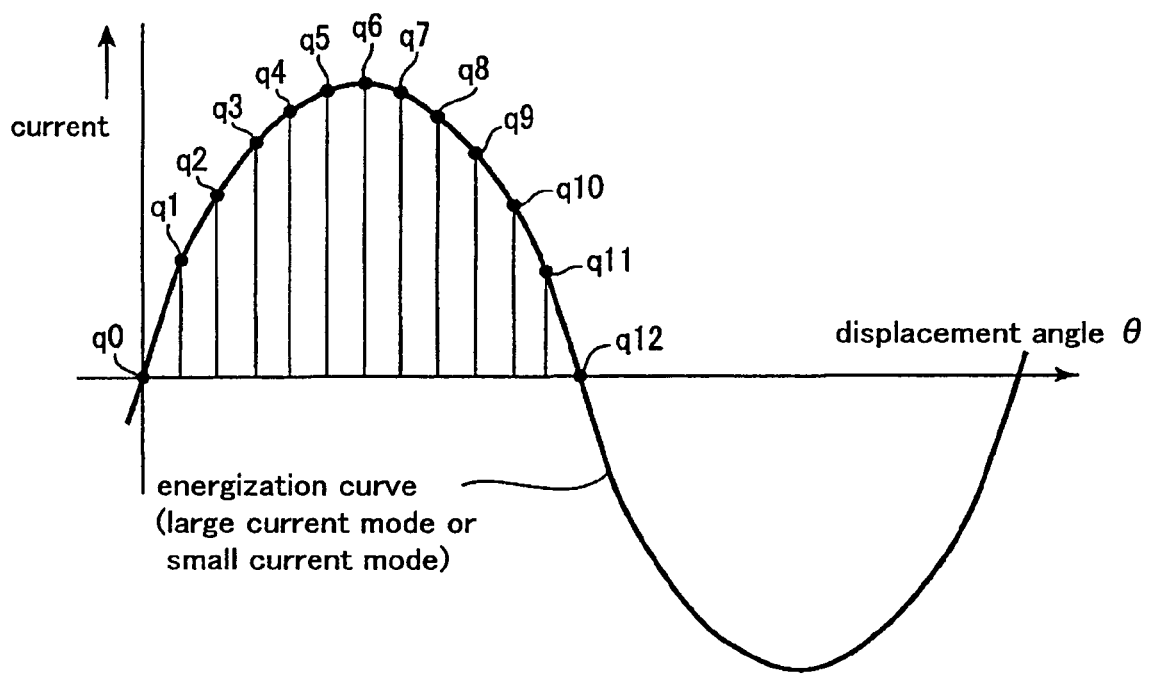
FIG. 7 is a graph diagram showing one example of a stepping motor energization curve which is set in the driver.

In the present embodiment, the stepping motors (pitch direction motor 3a and yaw direction motor 3b) are driven in microstep mode by the driver 6 such as described above. FIG. 7 is a graph diagram showing one example of a stepping motor energization curve which is set in the driver 6. Such an energization curve is stored for each of the large current and small current modes (see FIG. 5). Steps q0 to q12 on the energization curve shown in FIG. 7 each indicate the step by which the motor rotates for each drive pulse application.

More specifically, during the sampling interval T1 in FIG. 6, one drive pulse P=1 is output, and as a result, the energization curve advances one step, for example, from step q0 to step q1. If five drive pulses P=5 in the sampling interval T3 are output, the curve advances five steps, for example, from step q0 to step q5. That is, how many steps the energization curve advances is determined by the number of drive pulses (pps); in other words, the speed of the stepping motor is controlled by controlling the number of drive pulses (pps) that the driver 6 outputs per unit time. The generated torque of the stepping motor increases with the amount of current flown, but decreases with increasing speed; because of this characteristic, the maximum speed, particularly in the small current mode, must be limited in order to prevent step-out. This will be explained in detail later.

Turning back to FIG. 4, the mode switching section 7 effects mode switching between the large current mode and the small current mode when prescribed mode switching information is given. The "prescribed mode switching information" in this embodiment is information based on a) whether the operation is a still-image capture operation in the still image shooting mode, or b) whether the operation mode is a mode other than the still image capture mode (that is, live view, focusing, or moving image shooting).

In the case (a), the mode switching section 7 switches the driver 6 to the large current mode (the first driving mode), but in the case (b), it switches the driver 6 to the small current mode (the second driving mode). In this way, in the still image capture mode which requires high performance tracking of the target position, high speed tracking becomes possible though a large current is consumed, while in other operation modes, the driving mode is set to the small current mode, thus reducing the power consumption.

The operation of the shake amount detection circuit 142, coefficient conversion circuit 143, and control circuit 4 is controlled by the sequence control circuit 15. More specifically, when the shutter release button 101 is pressed, the sequence control circuit 15 controls the shake amount detection circuit 142, causing it to capture data signals concerning the amounts of shake (detx, dety) detected in the respective directions. Next, the sequence control circuit 15 controls the coefficient conversion circuit 143, causing it to convert the amounts of shake in the respective directions into the amounts of movement (px, py) in the respective directions. Then, the control circuit 4 is controlled to calculate the amounts of correction movement for the lens barrel 2 at every predetermined sampling interval based on the amounts of movement in the respective directions. In the case of the still-image capture in the still image shooting mode, for example, the above series of operations is repeated at predetermined intervals of time for anti-shake control of the lens barrel 2 (camera shake correction) during the period starting from the time that the shutter release button 101 is fully depressed and the driver 6 is set into the large current mode by the mode switching section 7, until the time that the exposure is completed. On the other hand, in the case of an operation mode other than the still image capture mode (for example, live view or moving image shooting), the driver 6 is set into the small current mode, and a series of operations similar to that described above is repeated.

A conventional small-size stepping motor having a stator core and a rotor core can be used as the stepping motor constituting each of the pitch direction motor 3a and the yaw direction motor 3b, and it is desirable to connect a screw rotating shaft directly to the rotor core and attach a moving piece (nut, etc.) to the screw rotating shaft so that the lens barrel 2 can be directly driven for camera shake correction.

(Detailed Description of the Driving Mechanism)

Figure 8:
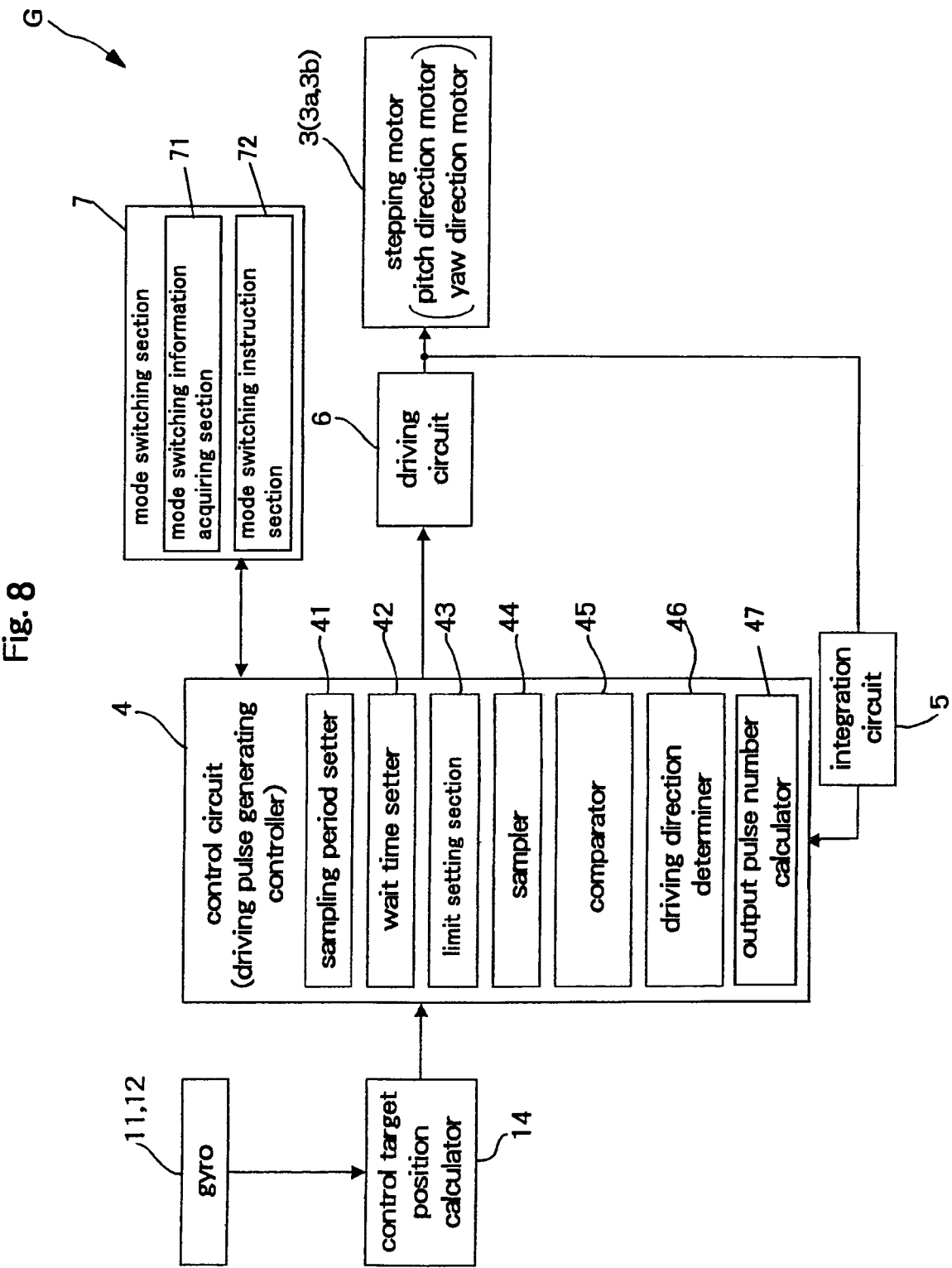
FIG. 8 is a functional block diagram for explaining the functions of a drive pulse generation control section according to the embodiment (it is also a block diagram showing one embodiment of the driving mechanism according to the present invention)

FIG. 8 is a functional block diagram for explaining the functions of the control circuit 4 (drive pulse generation control section) and the mode switching section 7 (it is also a block diagram showing one embodiment of the driving mechanism G according to the present invention). The primary function of the control circuit 4 is to set at every predetermined sampling interval the conditions for generating the drive pulses for driving the pitch direction motor 3a and the yaw direction motor 3b. The control circuit 4 comprises a sampling interval setting section 41, a wait time setting section 42, a limit setting section 43, a sampling section 44, a comparing section 45, a driving direction discrimination section 46, and an output pulse count calculating section 47. The mode switching section 7 comprises a mode switching information acquiring section 71 and a mode switching instruction section 72.

The sampling interval setting section 41 accepts the setting of the sampling interval at which to acquire the control target value for servo control from the control target position calculating section 14. The sampling interval may be set arbitrarily, and can be suitably selected from the range of, for example, about 0.1 ms to 2 ms. Generally, shorter sampling intervals serve to enhance the tracking performance since the control target value can be obtained at shorter intervals, but a proper sampling interval should be set by considering control computation power and the performance of the stepping motor.

When the driving target is approximated by a first-order lag system, the sampling interval can be set by considering its unique break frequency $f0$. The break frequency $f0$ is the frequency at which the response characteristic to vibration, etc. changes from a first relationship to a second relationship which is different from the first relationship. For example, when a prescribed vibration force Zin is applied to a target, and the vibrational displacement (output) of the target at this time is denoted by Zout, the break frequency $f0$ (the frequency of vibration) refers to the point at which the characteristic changes from the vibration region (first relationship region) where the relation Zin=Zout holds to the vibration region. (second relation region) where the relation Zin>Zout or Zin<Zout holds. When this is applied to the present embodiment, the point at which the driving response characteristic of the lens barrel 2 due to the pitch direction motor 3a and yaw direction motor 3b changes abruptly is the break frequency $f0$.

Figure 9:
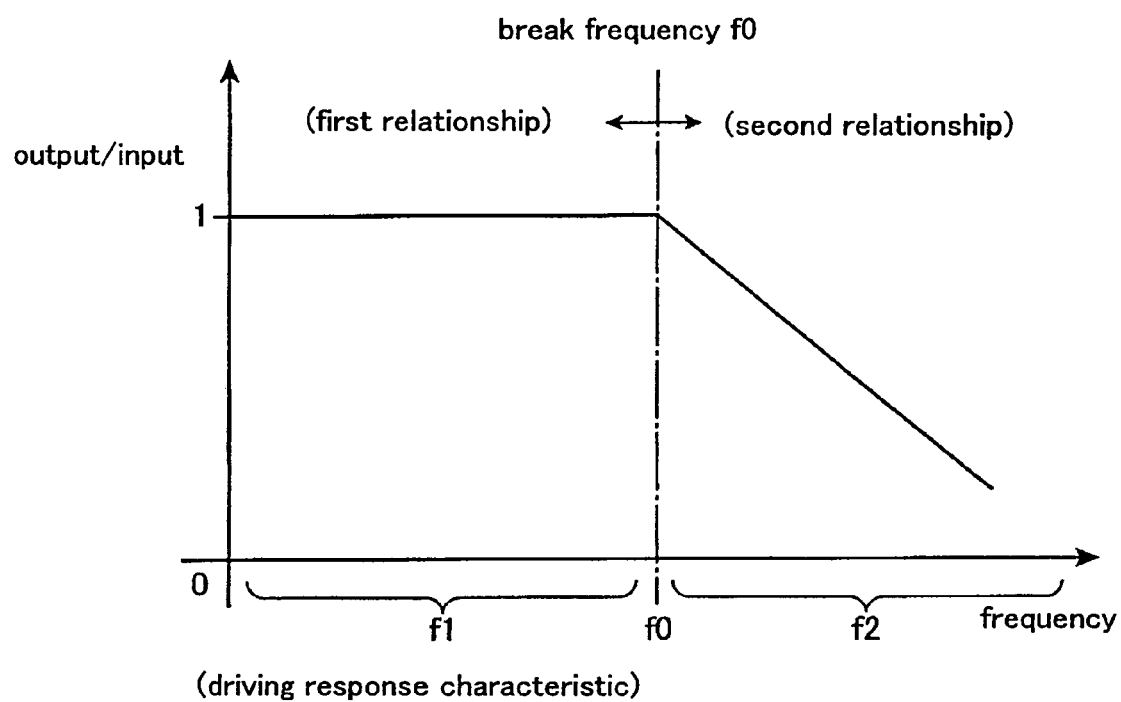
FIG. 9 is a graph diagram showing one example of a driving response characteristic.

FIG. 9 is a graph diagram showing one example of the driving response characteristic. In this case, when the driving force is applied to the lens barrel 2 in the frequency region f1 lower than the break frequency $f0$, the relationship between the prescribed vibration force Zin and the resulting displacement Zout of the lens barrel 2 is defined as Zout/Zin=1, which means that the lens barrel 2 is, as it were, caused to swing in a 1:1 relationship to the applied driving force (the first relationship). The speed of the stepping motor can be controlled by varying the pulse rate of the drive pulses; that is, in the first relationship region, since the response relation Zout/Zin=1 holds, it follows that the driving control (speed control) of the lens barrel 2 can be performed based on the pulse rate. Therefore, when making use of the characteristic of the first relationship, the sampling interval should be set longer than $1/f0$. However, when performing the driving control based on the pulse rate, the processing for the driving tends to become complex because there arises a need to perform computations for determining the pulse rate at every sampling interval.

On the other hand, when the driving force is applied to the lens barrel 2 in the frequency region f2 higher than the break frequency $f0$, the relationship between the prescribed vibration force Zin and the resulting displacement Zout of the lens barrel 2 becomes Zout/Zin<1, and the lens barrel 2 is therefore not caused to swing in a 1:1 relationship to the applied driving force (the second relationship). That is, the output cannot respond in time to the applied driving force, and the lens barrel 2 cannot be driven so as to faithfully track the applied input. In this case, the driving control of the lens barrel 2 cannot be performed based on the pulse rate, but this in turn means that, for any drive pulse input, the lens barrel 2 is driven only by a prescribed amount that can actually track the input; therefore, it becomes to perform the driving control (speed control) of the lens barrel 2 based only on the number of drive pulses. This offers the advantage of simplifying the processing for the driving. When making use of the characteristic of the second relationship having such an advantage, the sampling interval should be set shorter than $1/f0$. In the present embodiment, since the speed control is performed based on the number of drive pulses, it is desirable that the sampling interval be chosen to be shorter than $1/f0$.

The wait time setting section 42 accepts the setting for the drive pulse generation interval; more specifically, the separation between the last pulse generated in a first sampling interval (for example, the sampling interval T1 in FIG. 6) and the first pulse generated in a second sampling interval that follows (for example, the sampling interval T2 in FIG. 6) is set equal to a prescribed wait time. That is, the wait time setting section 42 prevents the occurrence of step-out by setting the prescribed wait time so that the separation between the last pulse generated in the first sampling interval and the first pulse generated in the second sampling interval that follows does not become abnormally small (if the separation is too small, this in effect means that the pulse generation interval becomes short, giving rise to the possibility of step-out).

The limit setting section 43 is a functional block that imposes a predetermined upper limit to the number of drive pulses to be output during the predetermined sampling interval that has been set by the sampling interval setting section 41. More specifically, when the driver 6 is switched to the small current mode by the mode switching section 7, the number of drive pulses to be output during each predetermined sampling interval is limited to a smaller number than that in the large current mode in order to prevent the occurrence of step-out while the stepping motor is being driven in the small current mode.

Figure 10:
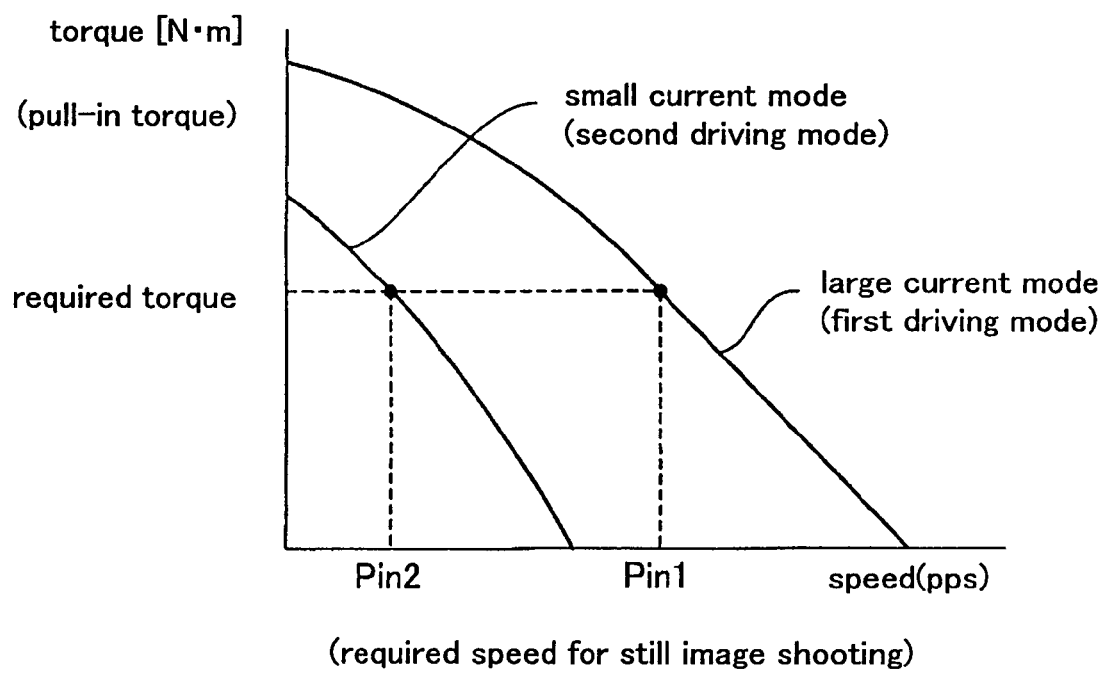
FIG. 10 is a graph diagram showing the relationship between generated torque and stepping motor speed.

The reason that the upper limit needs to be imposed on the number of drive pulses by the limit setting section 43 will be explained below. FIG. 10 is a graph diagram showing the relationship between the generated torque and the stepping motor speed (in this embodiment, the speed is determined solely by the number of drive pulses (pps) per unit time, as stated above). The generated torque here is the so-called pull-in torque for causing the rotor to rotate. The "required torque" shown in the figure is, in the present embodiment, the torque required to drive the lens barrel 2 in swinging fashion.

As is apparent from FIG. 10, in both the large current and small current modes, the generated torque tends to decrease as the speed is increased. That is, as the driving speed increases, it becomes increasingly impossible to generate a large torque and, when the speed exceeds a certain value, the "required torque" cannot be obtained, resulting in the occurrence of step-out. Here, since the generated torque is larger in the large current mode than in the small current mode as previously illustrated in FIG. 5, if a comparison is made by reference to the "required torque" of the same level, it can be seen that the stepping motor can be driven at higher speed in the large current mode. More specifically, as shown in FIG. 10, the critical point that leads to the occurrence of step-out occurs at a relatively low speed Pin2 in the small current mode but, in the large current mode, the critical point occurs at a higher speed Pin1 than the speed Pin2.

In this way, when driving the stepping motor in the small current mode, the driving speed of the stepping motor must be limited correspondingly; otherwise, the "required torque" may not be generated, and a step-out situation may occur. Accordingly, if drive pulses such as shown in FIG. 6, for example, are directly output not only in the large current mode but also in the small current mode, the torque may become insufficient and step-out may occur in the sampling interval T3 (P=5) or T4 (P=4) where the number of drive pulses is large.

Figure 11:
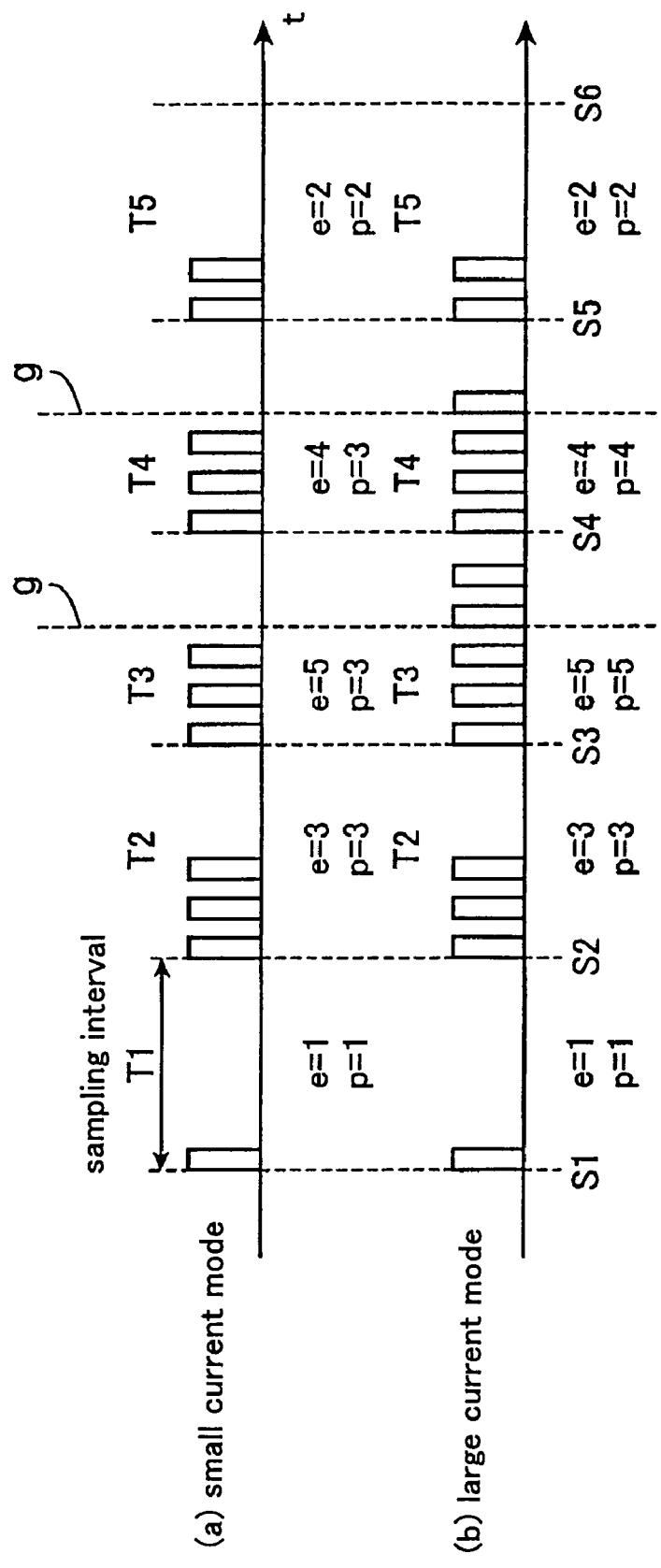
FIG. 11 is a time chart showing one example of drive pulse generation control, part (a) being for a small current mode and part (b) for a large current mode.

In view of this, when the driver 6 is switched to the small current mode by the mode switching section 7, the limit setting section 43 limits the maximum speed in the small current mode, as shown in FIG. 11, that is, the maximum number of drive pulses that can be generated during each sampling interval is limited so that a larger number of drive pulses than a predetermined number will not be output, regardless of the value of the target position deviation e.

More specifically, in the large current mode, the number, P, of drive pulses are output in accordance with the target position deviation e, as shown in FIG. 11(b) (same as FIG. 6); as a result, in this mode, priority is given to the target position tracking performance in the servo control mode. Accordingly, in the case of still image capture where the mode switching section 7 selects the large current mode, the camera shake correction mechanism is driven to its fullest potential (high speed driving), creating a situation where image blurring due to camera shake can be best prevented.

On other hand, in the small current mode, the number of pulses to be generated during each sampling interval is limited as shown in FIG. 11(a). The illustrated example shows the case where the upper limit to the number of drive pulses to be output is set to "3". Accordingly, in each of the sampling intervals T1, T2, and T5 where the value of the target position deviation e is small (e=1 to 3), the drive pulses are output in accordance with the target position deviation e, but in each of the sampling intervals T3 and T4 where the value of the target position deviation e is large (e>3), the number of drive pulses is limited to P=3, regardless of the value of the target position deviation e. That is, in the small current mode, a limit line g (the time at which the output of the drive pulses P=3 ends) is set within each sampling interval, and no drive pulses are output after that limit line g. In this way, in the small current mode where the generated torque is small, it becomes possible to prevent step-out which could occur when the stepping motor was driven at high speed by applying an excessive number of drive pulses.

In the small current mode, only three drive pulses P=3 are output, for example, even when the target position deviation e is 5; as a result, the target position tracking performance in servo control degrades compared with the case of the large current mode. That is, the camera shake correction performance drops. However, it can be said that the need to apply a high performance shake correction is relatively low in operation modes other than the still image capture mode. For example, if the camera shake correction performance is reduced in the live view mode, this does not cause a serious effect on the shooting performance. Further, when using the digital camera 1 in the moving image shooting mode, there also arises a need to prevent the driving noise of the stepping motor from being picked up by the microphone. Therefore, in such cases, the driving mode is deliberately switched to the small current mode to reduce the current consumption as much as possible and thereby reduce the power consumption or noise.

Turning back to FIG. 8, the sampling section 44 acquires the target position information for servo control from the control target position calculating section 14 at every sampling interval set by the sampling interval setting section 41. More specifically, the signals indicating the amounts of movement (px, py) in the respective directions are acquired from the coefficient conversion circuit 143 at every sampling interval.

The comparing section 45 compares the target position information acquired by the sampling section 44 with the swing position information of the lens barrel 2, i.e., the present position information of the rotor of the stepping motor (pitch direction motor 3a and yaw direction motor 3b) supplied as an integrated value signal from the integrator circuit 5, and obtains the positional deviation e between them. The lens barrel 2 is driven in swinging fashion by the pitch direction motor 3a and the yaw direction motor 3b so as to reduce the positional deviation e as close as possible to zero.

The driving direction discrimination section 46 discriminates the rotational direction of each stepping motor based on whether the positional deviation e obtained by the comparing section 45 is a deviation in the positive direction or the negative direction. Further, based on the thus discriminated rotational direction, the driving direction discrimination section 46 generates a control signal for rotating the rotor in the forward direction or the reverse direction by changing the sequence of energization of the stator coils.

In accordance with the positional deviation e obtained by the comparing section 45, the output pulse count calculating section 47 resets the previous drive pulse generation conditions at every sampling interval and performs calculations for setting the drive pulse generation conditions (the number of drive pulses to be generated) for the next sampling interval. That is, the output pulse count calculating section 47 sets new driving conditions for the stepping motor at every sampling interval so that the most suitable drive pulses for each particular sampling interval are applied to the stepping motor when driving it in servo control mode. However, in the small current mode, the maximum number of drive pulses that can be generated in each sampling interval is limited by the limit setting section 43, as earlier described.

The control signal concerning the forward or reverse rotation of the rotor, generated by the driving direction discrimination section 46, and the control signal concerning the number of drive pulses, generated by the output pulse count calculating section 47, are supplied to the driver 6. In response to these control signals, the driver 6 generates prescribed drive pulses and applies them to the pitch direction motor 3a and the yaw direction motor 3b for driving.

The mode switching information acquiring section 71 acquires information on whether the operation is a still-image capture operation in the still image shooting mode. For example, in a key scan loop of the digital camera 1, information on whether the shutter release button 101 is fully depressed or not is acquired. Here, provisions may be made to enable the user to enter the mode switching information by using the operation buttons 104.

When the mode switching information acquiring section 71 has acquired the prescribed mode switching information, the mode switching instruction section 72 sends a mode switching signal to the driver 6. More specifically, when information indicating that the shutter release button 101 is fully depressed is acquired, the operation mode of the driver 6 is switched from the small current mode to the large current mode. When the still image capture operation is completed, the operation mode of the driver 6 is switched from the large current mode back to the small current mode. At this time, an operation signal is sent to the limit setting section 43 of the control circuit 4 so that the maximum number of drive pulses will be limited.

(Description of the Operation)

Figure 12:
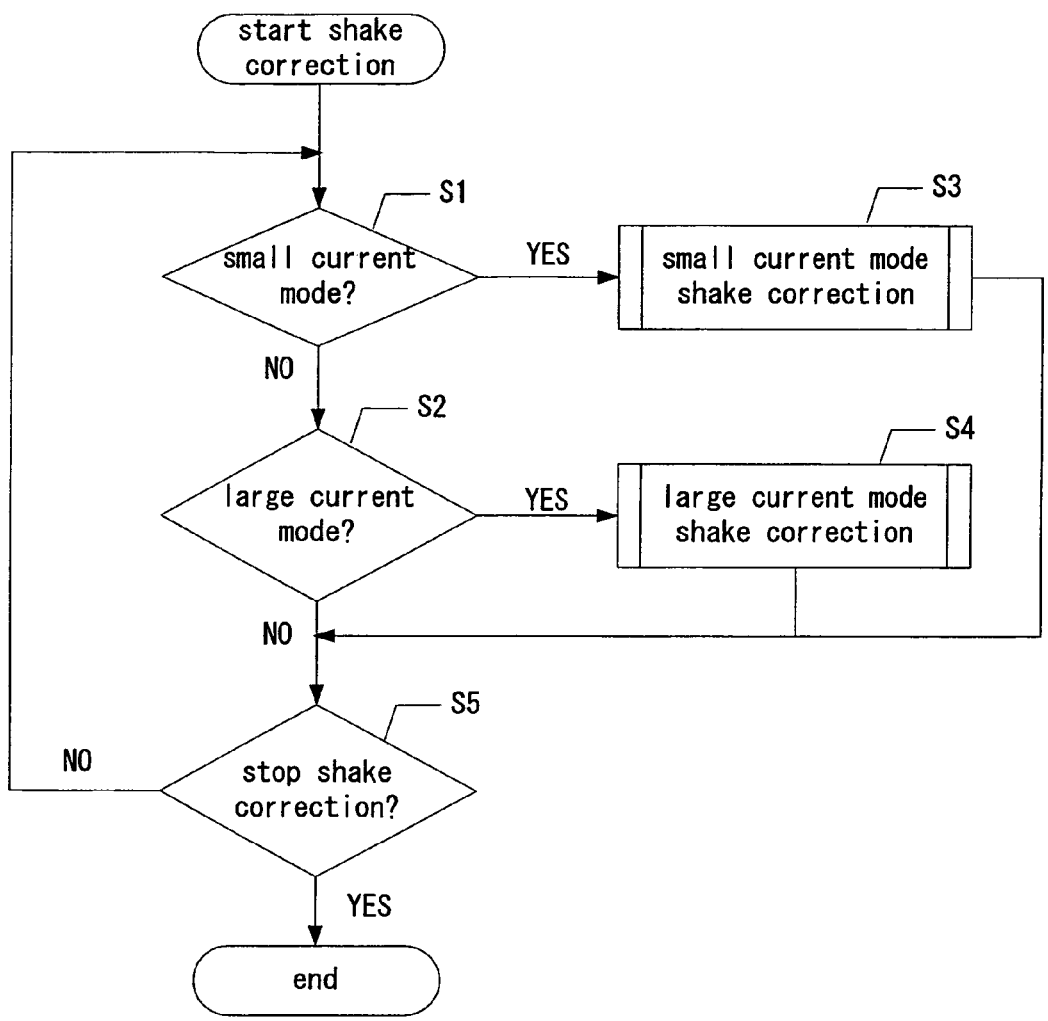
FIG. 12 is a flowchart showing a camera shake correction operation flow.

The camera shake correction operation of the digital camera 1 will be described below. FIG. 12 is a flowchart showing a camera shake correction operation flow. When the digital camera 1 enters a shake correction (camera shake correction) execution mode, a key scan loop is executed, and polling is performed to check whether the driving mode is the small current mode (step S1) or the large current mode (step S2).

When it is determined in step S1 that the driving mode is the small current mode (yes in step S1), this means that the operation is other than the capture operation in the still image shooting mode, that is, the shutter release button 101 is not fully depressed to perform the capture operation. In this case, the driver 6 is set into the "small current mode" by the mode switching section 7, and the camera shake correction in the small current mode is performed (step S3).

In the small current mode, as shown in FIG. 11(a), the maximum number of drive pulses to be output during each of the sampling intervals T1 to T5 is limited by the limit setting section 43 to a predetermined value (in the illustrated example, P=3), and the maximum speed is thus limited to prevent step-out. In this case, while the camera shake correction performance drops, the current consumption by the pitch direction motor 3a and yaw direction motor 3b decreases, and the driving noise also decreases, achieving reductions in noise as well as in power consumption.

When it is determined in step S2 that the driving mode is the large current mode (yes in step S2), this means that the operation is the capture operation in the still image shooting mode, that is, the shutter release button 101 is fully depressed to perform the capture operation. In this case, the driver 6 is set into the "large current mode" by the mode switching section 7, and the camera shake correction in the large current mode is performed (step S4).

In the large current mode, as shown in FIG. 11(b), no upper limit is set by the limit setting section 43, and the drive pulses are output in accordance with the positional deviation e during each of the sampling intervals T1 to T5, thus making it possible to drive the pitch direction motor 3a and the yaw direction motor 3b at high speed. This serves to enhance the camera shake correction performance, and thus, camera shake correction with good accuracy can be performed in the still image capture operation.

After that, it is determined whether the shake correction execution mode of the digital camera 1 has been cleared or not (step S5); if the shake correction execution mode has been cleared (yes in step S5), the pitch direction motor 3a and the yaw direction motor 3b are de-energized. On the other hand, if the shake correction execution mode has not been cleared yet (no in step S5), the process returns to step S1, to repeat the steps for determining whether the driving mode is the small current mode or the large current mode.

Figure 13:
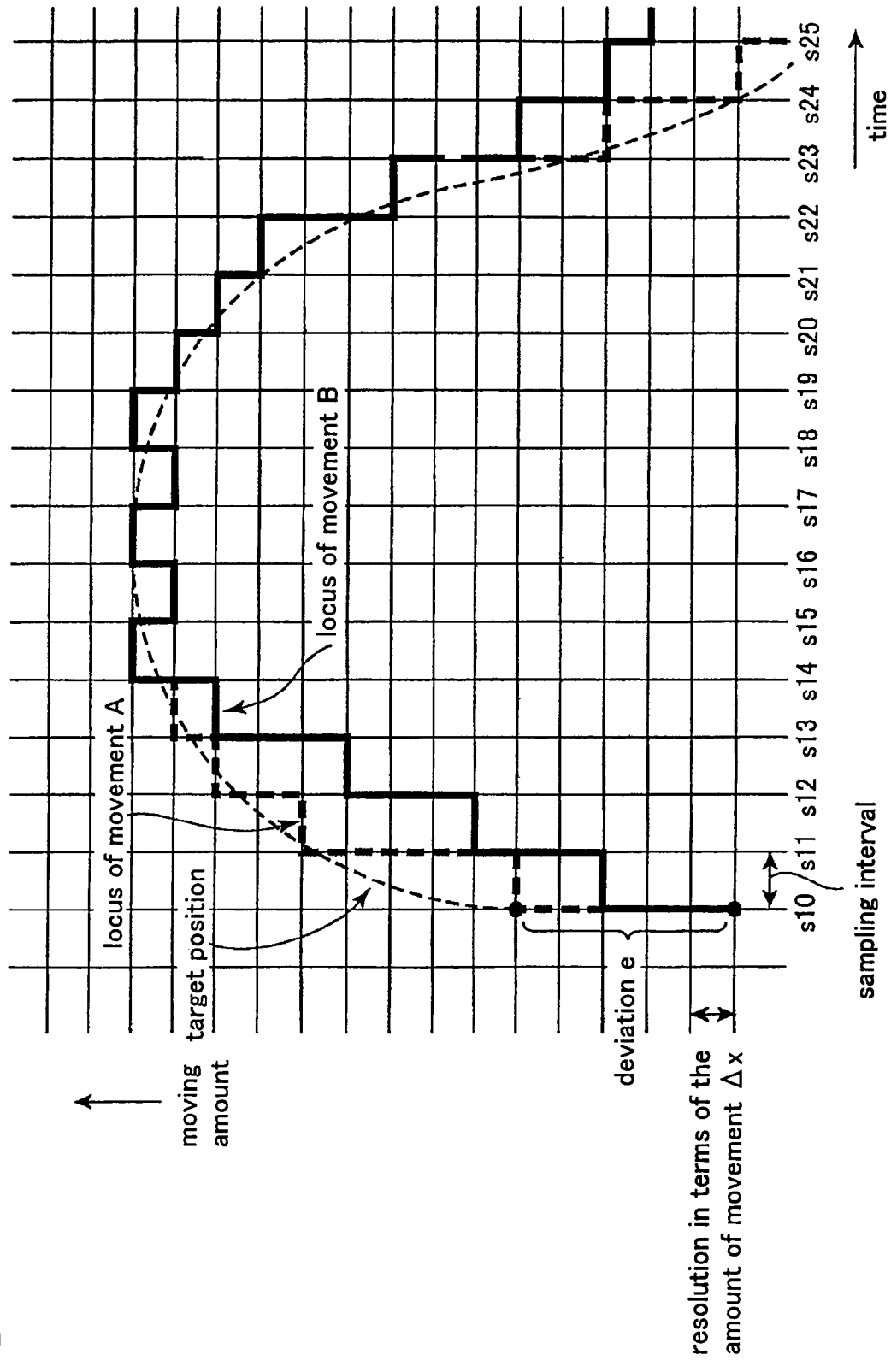
FIG. 13 is a graph diagram schematically showing the relationship between the control target position and the locus of movement.

FIG. 13 is a graph diagram schematically showing the relationship between the control target position and the locus of movement when the servo control is respectively performed in the small current mode and the large current mode shown in the time chart of FIG. 11. Here, consider the case where the target position whose control target value varies in such a manner as to describe a sin curve as shown in the figure is being acquired from the control target position calculating section 14. In the figure, the locus of movement A shows how the target position is being tracked by servo control in the large current mode, while the locus of movement B shows how the target position is being tracked by servo control in the small current mode. Further, the "resolution in terms of the amount of movement Δx" in the figure indicates the amount of movement per drive pulse generated in each sampling interval.

First, in the large current mode (the locus of movement A), the target position is tracked even during the sampling intervals s10 to s13 where the amount of change of the target position is relatively large and the positional deviation e is also large. That is, the camera shake correction is accomplished with good accuracy. In this case, in the operation of the control circuit 4, since the positional deviation e is large in the positive direction, the driving direction discrimination section 46 always determines that the positional deviation is in the positive direction, and the output pulse count calculating section 47 generates a control signal for outputting a large number of drive pulses so as to achieve a speed high enough to track the large positional deviation e. For example, in the sampling intervals s10 and s11, an instruction for outputting five drive pulses is issued to drive the stepping motor at high speed.

In the sampling interval s14 that follows, since the positional deviation is reduced, the output pulse count calculating section 47 generates a control signal for outputting drive pulses with increased resolution at a medium speed. Further, in the next sampling interval s15, since the positional deviation is further reduced, the output pulse count calculating section 47 generates a control signal for outputting drive pulses with high resolution at a low speed (the driving direction is also reversed into the negative direction). In this way, since servo control is performed by appropriately adjusting the driving speed and the positioning resolution according to the degree of deviation from the target position at every sampling interval s10 to s25, servo control with enhanced trackability to the target value can be achieved.

On the other hand, in the small current mode (the locus of movement B), since the maximum speed is limited (p=3) by the limit setting section 43, the target position tracking performance drops in the sampling intervals s10 to s13 and s23 to s25 where the amount of change of the target position is relatively large. However, even during these intervals, the target position is adequately tracked and, during the sampling intervals s14 to s22 where the amount of change of the position is relatively small, the target position is tracked with good accuracy; therefore, it can be said that sufficient camera shake correction performance is ensured for such operation modes as live view and focusing.

(Modified Embodiment of the Driving Mechanism)

Figure 14:
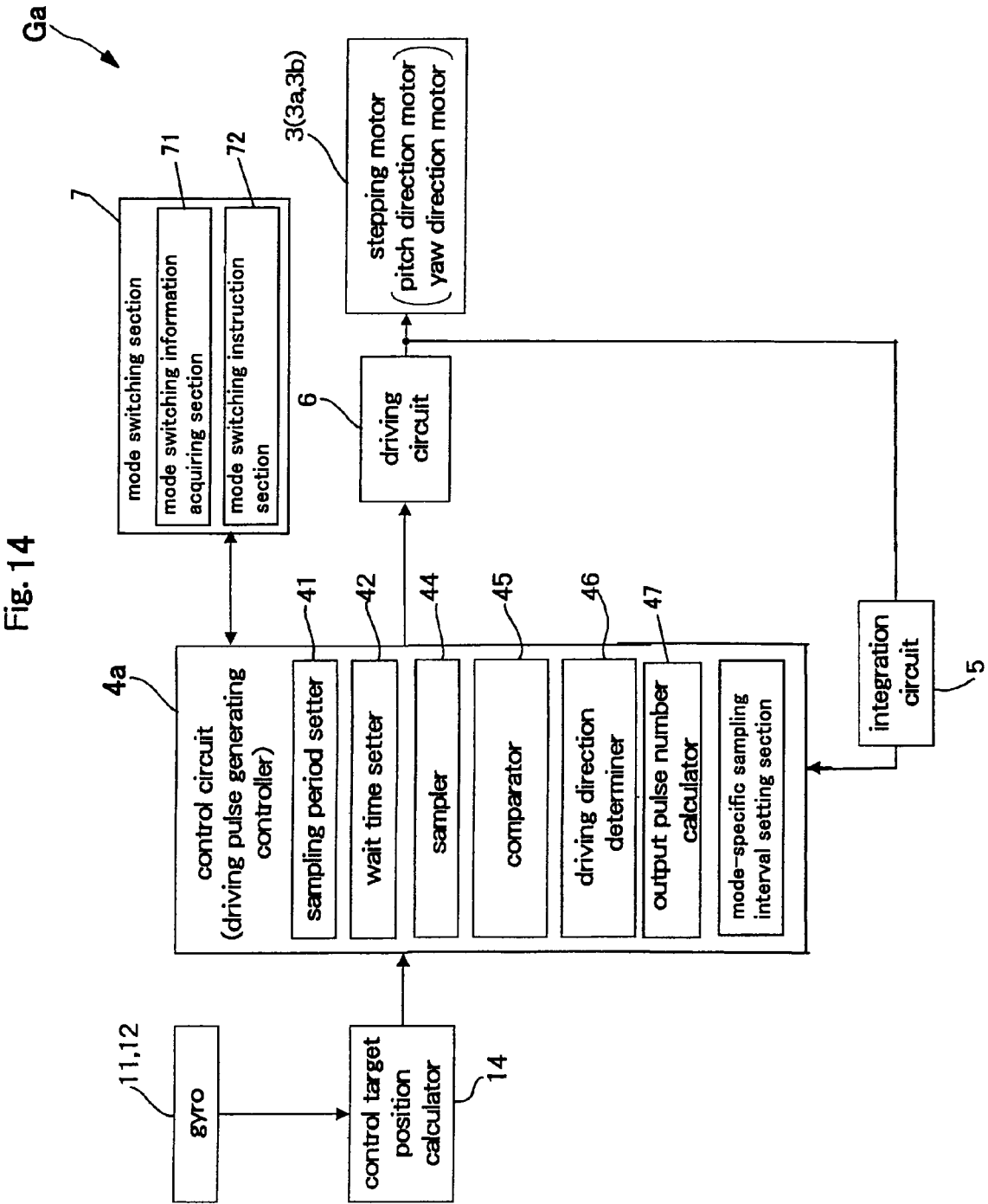
FIG. 14 is a functional block diagram for explaining the functions of a drive pulse generation control section according to a modified embodiment (it is also a block diagram showing an alternative embodiment of the driving mechanism according to the present invention)
Figure 15:
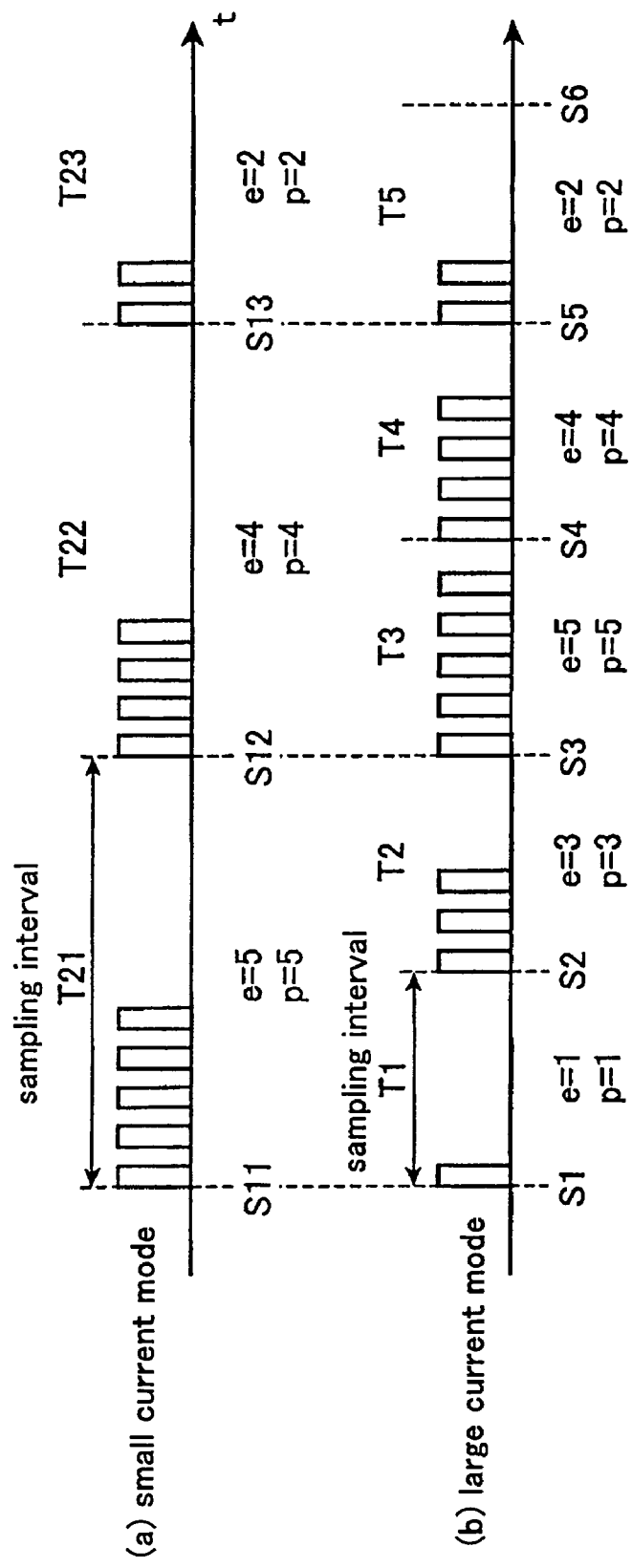
FIG. 15 is a time chart showing another example of drive pulse generation control, part (a) being for the small current mode and part (b) for the large current mode.

FIG. 14 is a functional block diagram for explaining the functions of a control circuit 4a (drive pulse generation control section), whose operation differs from that shown in the foregoing embodiment, and the mode switching section 7 (it is also a block diagram showing an alternative embodiment of the driving mechanism Ga according to the present invention), and FIG. 15 is a time chart showing one example of how the drive pulses are generated in the large current and small current modes in this modified embodiment. In the foregoing embodiment, the sampling intervals are constant in duration, and speed control (speed limiting in the small current mode) is performed by adjusting the number of drive pulses to be output during each sampling interval; by contrast, in the modified embodiment, the sampling interval is set differently in the small current mode than in the large current mode, and speed control (speed limiting in the small current mode) is, in effect, performed by adjusting the number of drive pulses to be output per unit time. The following description is given by focusing on the difference from the foregoing embodiment.

In FIG. 14, the difference from the foregoing embodiment shown in FIG. 8 is that the limit setting section 43 is replaced by a mode-specific sampling interval setting section 48. The mode-specific sampling interval setting section 48 is a functional block that sets the sampling interval appropriate to each of the large current and small current modes. In this case, the sampling intervals in the respective modes can be set in advance by the sampling interval setting section 41. Then, when the driver 6 is switched to the small current mode by the mode switching section 7, the mode-specific sampling interval setting section 48 sets the sampling interval longer than in the large current mode, thereby in effect reducing the number of drive pulses to be output per unit time and thus preventing the occurrence of step-out when driving the stepping motor in the small current mode.

As shown in FIGS. 15(a) and 15(b), the mode-specific sampling interval setting section 48, for example, sets the sampling interval in the small current mode twice as long as that in the large current mode. That is, by setting the spacing of the sampling times S11 to S13 in the small current mode at twice the spacing of the sampling times S1 to S6 in the large current mode, the duration of each of the sampling intervals T21 to T23 is set twice as long as the duration of each of the sampling intervals T1 to T5 in the large current mode.

Accordingly, unlike the foregoing embodiment, the number of drive pulses, p, matches the value of the positional deviation e in the small current mode as well as in the large current mode, but since the sampling interval is longer in the small current mode than in the large current mode, the number of drive pulses per unit time is smaller in the small current mode. For example, in the sampling interval T21 in the small current mode, five drive pulses, P=5, are output for the positional deviation e=5 but, when viewed on the scale of the sampling intervals T1 to T5 in the large current mode, this translates into only 2.5 drive pulses, P=2.5, per sampling interval. Thus, the driving speed of the stepping motor is limited in the small current mode to prevent the occurrence of step-out due to excessive speed.

In the above configuration, the relationship between the sampling interval in the large current mode and the sampling interval in the small current mode need not necessarily be limited to the ratio of 1:2 as shown in FIGS. 15(a) and 15(b), but it should be set to a suitable ratio by considering the speed that can lead to step-out. Further, in the small current mode, the method of limiting the number of drive pulses to be generated may be used in combination with the above method.

Other Embodiments of the Invention

While the present invention has been described above with reference to exemplary embodiments, the invention is not limited to the above specific embodiments, but other embodiments such as described below may also be employed.

(1) Trapezoidal Control Method

The above embodiments have been described for the case where the sampling interval is set relatively short (shorter than 1/f0) and the speed control can be performed based solely on the number of drive pulses to be applied to the stepping motor, but it should be noted that, when the sampling interval is set relatively long, the speed can be controlled by performing acceleration/deceleration control (the so-called trapezoidal control) within the sampling interval.

Figure 16:
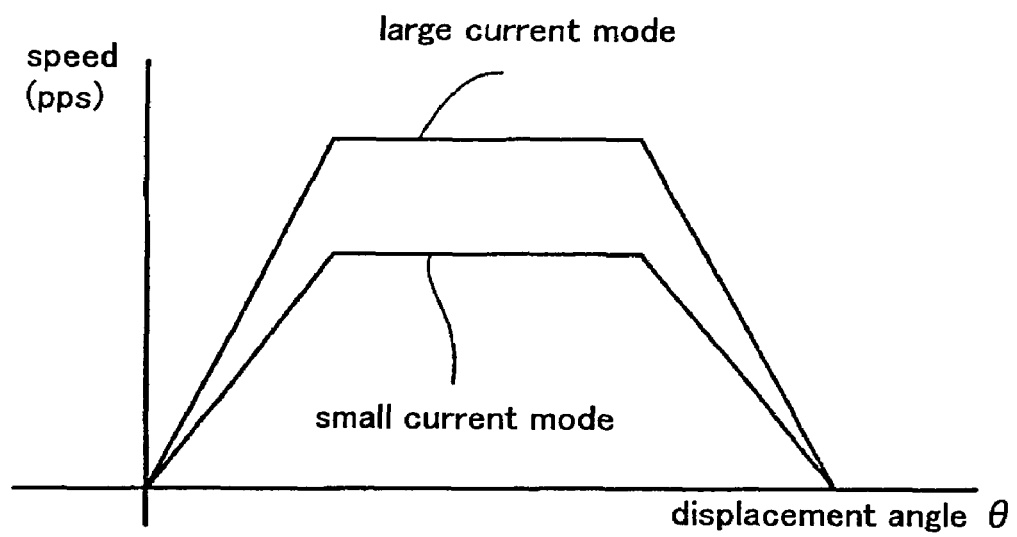
FIG. 16 is a graph diagram showing another example of drive pulse generation control.

FIG. 16 shows the waveforms output in the large current mode and the small current mode, respectively, in such trapezoidal control. As shown, in both the large current and small current modes, control is performed that involves acceleration (the rising slope portion of the graph) and deceleration (the falling slope portion of the graph) but, in the small current mode, the maximum speed (the flat portion) is set lower than in the large current mode. The maximum speed in each mode should be set appropriately by considering the step-out characteristic of the stepping motor.

(2) Mode Switching Based on Positional Deviation

The above embodiments have been described as effecting the switching between the large current mode and the small current mode based on whether the operation mode is the still image capture mode or not, but the mode switching may be effected based on various other kinds of mode switching information; furthermore, provisions may be made to allow the user to effect the switching manually. For example, the mode switching may be made simply between the still image shooting mode (large current mode) and the moving image shooting mode (small current mode).

Provisions may also be made to effect the mode switching between the large current mode and the small current mode based on the deviation between the target position of the servo control and the present position. To describe with reference to FIG. 8, the mode switching section 7 may be configured to effect the mode switching between the large current mode and the small current mode based on whether the deviation between the driving target position information obtained by the control target position calculating section 14 and the present position information of the stepping motor (pitch direction motor 3a and yaw direction motor 3b) exceeds a predetermined threshold value; in this case, if the deviation exceeds the predetermined threshold value, switching is made to the large current mode so that the target position tracking performance can be enhanced by driving the stepping motor at high speed.

When employing the above configuration, the comparing section 45 of the control circuit 4 which is a functional block for obtaining the positional deviation e can be constructed to include a threshold value exceeded/not-exceeded judging section which judges whether or not the obtained positional deviation e exceeds the predetermined threshold value, and the mode switching information acquiring section 71 of the mode switching section 7 can be configured to acquire a "threshold exceeded" signal from the threshold value exceeded/not-exceeded judging section as the mode switching information. Then, when the mode switching information acquiring section 71 receives the "threshold exceeded" signal, the mode switching instruction section 72 causes the driver 6 to switch to the large current mode to drive the stepping motor at high speed in order to eliminate the large positional deviation e.

According to the above configuration, when the target position deviation in the servo control is large, switching is made to the large current mode so that the stepping motor can be driven at high speed, while when the deviation is small, switching is made to the small current mode in which the current consumption is small; in this way, since power is supplied to the stepping motor according to the need for camera shake correction, and unnecessary current consumption is thus reduced, the effect of power consumption reduction can be achieved while constantly ensuring excellent camera shake correction performance.

While the present invention has been described and illustrated with reference to specific embodiments in which the driving mechanism (driving method) of the invention is applied to the camera shake correction mechanism or the like used in an imaging apparatus, it will be recognized that the invention can also be applied to other driving systems in an imaging apparatus, such as a zoom system or an aperture driving mechanism. However, it is particularly preferable to apply the invention to a camera shake correction mechanism, since reductions in the size and cost of the digital camera can be achieved by making use of the various advantages of the stepping motor, including the advantage that, since it can be controlled in open loop mode, the position sensor and the feedback control system can be omitted and the control configuration can be simplified. Further, the target to be driven by the camera shake correction mechanism may be the lens barrel as described in the above embodiments, or may be the imaging device itself. It will also be recognized that the lens barrel to be driven is not limited to the folded-optics type but may include a collapsible barrel type.

Furthermore, the driving mechanism (driving method) of the present invention can also be applied to various servo control driving mechanisms in other apparatuses than the imaging apparatus, such as various kinds of electric apparatuses, machine apparatuses, and optical apparatuses. For example, the invention can also be applied to various kinds of robot apparatuses, measuring apparatuses, and valve operating apparatuses.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A servo driving method to drive a stepping motor driven by a predetermined driving pulse, by a servo control method, comprising:
    a setting step of setting a driving mode of the stepping motor switchable at least between a first driving mode, in which the stepping motor is driven with a relatively large current, and a second driving mode in which the stepping motor is driven with a relatively small current,
    a switching step of switching the driving mode between the first driving mode and the second driving mode when a predetermined mode switching information is given:
    a setting step of setting a predetermined sampling interval;
    an acquiring step of acquiring control target information at every predetermined sampling interval; and
    a setting step of setting conditions for generating drive pulses for driving the stepping motor at every predetermined sampling interval based on the acquired control target information,
    wherein the sampling interval in the first driving mode and the sampling interval in the second driving mode are the same in duration, while a maximum number of drive pulses that can be generated within the duration of the sampling interval is set smaller in the second driving mode than in the first driving mode.

2. A servo driving method as claimed in claim 1, wherein the stepping motor is driven in microstepping mode.

3. A servo driving method to drive a stepping motor driven by a predetermined driving pulse, by a servo control method, comprising:
    a setting step of setting a driving mode of the stepping motor switchable at least between a first driving mode, in which the stepping motor is driven with a relatively large current, and a second driving mode in which the stepping motor is driven with a relatively small current,
    a switching step of switching the driving mode between the first driving mode and the second driving mode when a predetermined mode switching information is given:
    a setting step of setting a predetermined sampling interval;
    an acquiring step of acquiring control target information at every predetermined sampling interval; and
    a setting step of setting conditions for generating drive pulses for driving the stepping motor at every predetermined sampling interval based on the acquired control target information,
    wherein the sampling interval in the first driving mode and the sampling interval in the second driving mode have different durations from each other, and the sampling interval in the second driving mode is set longer than the sampling interval in the first driving mode.

4. A servo driving method as claimed in claim 3, wherein the stepping motor is driven in microstepping mode.

5. A stepping motor servo driving mechanism, comprising:
    a stepping motor which is driven by a predetermined drive pulses in accordance with a servo control scheme;
    a driver which can at least drive the stepping motor by selectively switching between a first driving mode, in which the stepping motor is driven with a relatively large current, and a second driving mode, in which the stepping motor is driven with a relatively small current;
    a mode switching section which performs switching between the first driving mode and the second driving mode when a predetermined mode switching information is given; and
    a drive pulse generation control section which controls conditions for driving the drive pulses in accordance with the driving mode,
    wherein a predetermined sampling interval at which to acquire control target information is set in the drive pulse generation control section, and the drive pulse generation control section comprises a calculating section which, at every predetermined sampling interval, resets the previous drive pulse generation conditions and performs calculations for setting the drive pulse generation conditions for the next sampling interval, and a limit setting section which sets an upper limit on the number of drive pulses to be generated within the sampling interval, in accordance with the mode switching information for switching between the first driving mode and the second driving mode by the mode switching section.

6. A stepping motor servo driving mechanism, comprising:
    a stepping motor which is driven by a predetermined drive pulses in accordance with a servo control scheme;
    a driver which can at least drive the stepping motor by selectively switching between a first driving mode, which the stepping motor is driven with a relatively large current, and a second driving mode, in which the stepping motor is driven with a relatively small current;
    a mode switching section which performs switching between the first driving mode and the second driving mode when a predetermined mode switching information is given; and
    a drive pulse generation control section which controls conditions for driving the drive pulses in accordance with the driving mode,
    wherein a predetermined sampling interval at which to acquire control target information is set in the drive pulse generation control section, and the drive pulse generation control section comprises a calculating section which, at every predetermined sampling interval, resets the previous drive pulse generation conditions and performs calculations for setting the drive pulse generation conditions for the next sampling interval, and a sampling interval setting section which varies the sampling interval in accordance with the mode switching information for switching between the first driving mode and the second driving mode by the mode switching section.

7. An imaging apparatus, comprising:

an image shooting means for shooting an image of a subject;

a camera shake correcting mechanism configured to correct a camera shake occurring when the image shooting means performs the image shooting operation; and a control target position calculating section for calculating a driving target position for the camera shake correcting mechanism based on the amount of shake detected by a shake detecting sensor, wherein the camera shake correcting mechanism further comprises:

a stepping motor which is driven by a predetermined drive pulses in accordance with a servo control scheme;

a driver which can at least drive the stepping motor by selectively switching between a first driving mode, in which the stepping motor is driven with a relatively large current, and a second driving mode, in which the stepping motor is driven with a relatively small current;

a mode switching section which performs switching between the first driving mode and the second driving mode when a predetermined mode switching information is given; and a drive pulse generation control section which controls conditions for driving the drive pulses in accordance with the driving mode.

8. An imaging apparatus as claimed in claim 7, wherein the mode switching section is switched the mode to the first driving mode when capturing a still image and to the second driving mode when performing other operations.

9. An imaging apparatus as claimed in claim 7, wherein the mode switching section is switching between the first driving mode and the second driving mode based on whether the deviation between the driving target position information obtained by the control target position calculating section and the present position of the stepping motor exceeds a predetermined threshold value or not, and to effect the switching to the first driving mode when the deviation exceeds the predetermined threshold value.

* * * * *

UNITED STATES PATENT AND TRADEMARK OFFICE
CERTIFICATE OF CORRECTION

| | | |
|---|---|---|
| PATENT NO. | : 7,592,759 B2 | Page 1 of 1 |
| APPLICATION NO. | : 11/272567 | |
| DATED | : September 22, 2009 | |
| INVENTOR(S) | : Kazuhiro Shibatani | |

It is certified that error appears in the above-identified patent and that said Letters Patent is hereby corrected as shown below:

<u>In the Claims</u>

In column 21, claim 1, line 39, immediately after "second driving mode" insert --,--.

In column 21, claim 1, line 43, immediately after "information is given" replace ":" with --;--.

In column 22, claim 3, line 3, immediately after "information is given" replace ":" with --;--.

In column 22, claim 6, line 51, before "which the stepping" insert --in--.

Signed and Sealed this

Twenty-second Day of February, 2011

David J. Kappos
*Director of the United States Patent and Trademark Office*